(12) United States Patent
Kobayashi et al.

(10) Patent No.: US 10,892,853 B2
(45) Date of Patent: Jan. 12, 2021

(54) TRANSMISSION APPARATUS AND METHOD, AND RECEPTION APPARATUS AND METHOD

(71) Applicant: Sony Corporation, Tokyo (JP)

(72) Inventors: Seiji Kobayashi, Kanagawa (JP); Sachio Iida, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/303,531

(22) PCT Filed: May 29, 2017

(86) PCT No.: PCT/JP2017/019833
§ 371 (c)(1),
(2) Date: Nov. 20, 2018

(87) PCT Pub. No.: WO2017/212959
PCT Pub. Date: Dec. 14, 2017

(65) Prior Publication Data
US 2020/0007266 A1    Jan. 2, 2020

(30) Foreign Application Priority Data
Jun. 10, 2016    (JP) .................. 2016-116384

(51) Int. Cl.
*H04L 1/00* (2006.01)
*H04L 27/10* (2006.01)
*H04L 27/12* (2006.01)

(52) U.S. Cl.
CPC ............ *H04L 1/009* (2013.01); *H04L 1/0041* (2013.01); *H04L 1/0061* (2013.01); *H04L 27/103* (2013.01); *H04L 27/12* (2013.01)

(58) Field of Classification Search
CPC ....... H04L 1/009; H04L 27/12; H04L 1/0061; H04L 27/103; H04L 1/0041; H04L 27/10;
(Continued)

(56) References Cited

U.S. PATENT DOCUMENTS 5,029,186 A * 7/1991 Maseng ............. H04L 27/2338
375/262
5,673,291 A * 9/1997 Dent ................. H03M 13/2721
329/304
(Continued)

FOREIGN PATENT DOCUMENTS

JP    08-018486 A    1/1996
JP    09-083582 A    3/1997
(Continued)

*Primary Examiner* — Kenneth T Lam
(74) *Attorney, Agent, or Firm* — Michael Best & Friedrich LLP

(57) ABSTRACT

Signal transmission with symbol correction is disclosed. In one example, processing includes selection of one of known data and unknown data for each of symbols, as transmission data, while selecting a symbol of the known data for a reception side at one or both of timings of immediately before and immediately after selection of a symbol of unknown data for the reception side, modulation of each of the symbols of the selected transmission data, and transmission of a transmission signal obtained. Moreover, processing includes: reception of a transmission signal transmitted from a transmission side; and correction of a symbol of unknown data included in the received transmission signal on the basis of a symbol of known data included in the received transmission signal.

18 Claims, 22 Drawing Sheets

(58) Field of Classification Search
CPC .. H04B 1/16; H04B 7/005; H04B 1/04; H04J 13/00
See application file for complete search history.

(56) References Cited

U.S. PATENT DOCUMENTS

| | | | |
|---|---|---|---|
| 7,526,016 B2* | 4/2009 | Yuan | H04J 3/0608 375/150 |
| 2006/0176983 A1* | 8/2006 | Wadsworth | H04L 25/0232 375/343 |
| 2008/0253349 A1* | 10/2008 | Yu | H04L 27/0008 370/345 |
| 2016/0261306 A1* | 9/2016 | Seller | H04W 56/0015 |
| 2017/0207814 A1* | 7/2017 | Kobayashi | H04B 1/715 |

FOREIGN PATENT DOCUMENTS

| | | |
|---|---|---|
| JP | 2000-115269 A | 4/2000 |
| JP | 4000088 B2 | 8/2007 |
| JP | 2016-046618 A | 4/2016 |

\* cited by examiner

TRANSMISSION APPARATUS AND METHOD, AND RECEPTION APPARATUS AND METHOD

TECHNICAL FIELD

The present technology relates to a transmission apparatus and method, and a reception apparatus and method, and more particularly relates to a transmission apparatus and method, and a reception apparatus and method, capable of transmitting information with higher accuracy.

BACKGROUND ART

There is a conventionally disclosed method of setting a tap coefficient for a filter according to a known signal pattern and removing an interference component by using the filter (for example, refer to Patent Document 1).

CITATION LIST

Patent Document

Patent Document 1: Japanese Patent No. 4000088

SUMMARY OF THE INVENTION

Problems to be Solved by the Invention

The method described in Patent Document 1, however, has a possibility that changing tap coefficients might also change filter characteristics, leading to an increase in high frequency noise while removing intersymbol interference.

The present technology has been proposed in view of such a situation, and aims to transmit information with higher accuracy.

Solution to Problems

A transmission apparatus according to an aspect of the present technology is a transmission apparatus including: a selection unit that selects one of known data and unknown data for each of symbols, as transmission data, while selecting a symbol of the known data for a reception side at one or both of timings of immediately before and immediately after selection of a symbol of the unknown data for the reception side; a modulation unit that modulates each of the symbols of the transmission data, selected by the selection unit; and a transmission unit that transmits a transmission signal obtained by modulation of each of the symbols of the transmission data performed by the modulation unit.

The known data can be a synchronization pattern for synchronization.

The modulation unit can apply Gaussian filtered minimum shift keying (GMSK) modulation to each of symbols of the transmission data.

The modulation unit can further apply chirp modulation on the transmission data.

The transmission unit can transmit the transmission signal a plurality of times.

The selection unit can select the symbol of the known data located at one or both of immediately before and immediately after each of all the symbols of the unknown data.

The selection unit can alternately select the symbol of the known data and the symbol of the unknown data.

The selection unit can consecutively select a plurality of symbols being part of the unknown data.

The selection unit can consecutively select a plurality of symbols being part of the known data.

A transmission method according to an aspect of the present technology is a transmission method including: selecting one of known data and unknown data for each of symbols, as transmission data, while selecting a symbol of the known data for a reception side at one or both of timings of immediately before and immediately after selection of a symbol of the unknown data for the reception side; modulating each of the symbols of the selected transmission data; and transmitting a transmission signal obtained by modulation of each of the symbols of the transmission data.

A reception apparatus according to another aspect of the present technology is a reception apparatus including: a reception unit that receives a transmission signal transmitted from a transmission side; and a correction unit that corrects a symbol of unknown data included in the transmission signal on the basis of a symbol of known data included in the transmission signal received by the reception unit.

The correction unit can correct the symbol of the unknown data on the basis of the symbol of the known data located at one or both of immediately before and it after the symbol of the unknown data.

The known data can be arranged on a Q axis and the unknown data can be arranged on an I axis.

The correction unit can apply rotation correction on the unknown data.

The transmission signal can be a signal that has undergone Gaussian filtered minimum shift keying (GMSK) modulation.

The correction unit can apply amplitude correction on the unknown data.

In the transmission signal, the known data and the unknown data can be alternately arranged for each of symbols.

The correction unit can correct the symbol of the known data and then correct the symbol of the unknown data on the basis of the corrected symbol of the known data.

The reception unit can receive the transmission signal including an identical symbol a plurality of times and combine waveforms of the transmission signals, and the correction unit can correct the symbol of the unknown data included in a combined signal on the basis of the symbol of the known data included in the combined signal obtained by the reception unit.

A reception method according to another aspect of the present technology is a reception method including: receiving a transmission signal transmitted from a transmission side; and correcting a symbol of unknown data included in the received transmission signal on the basis of a symbol of known data included in the received transmission signal.

With the transmission apparatus and method according to an aspect of the present technology, one of known data and unknown data is selected for each of symbols as transmission data while selecting a symbol of the known data for a reception side at one or both of timings of immediately before and immediately after selection of the symbol of unknown data for the reception side, each of the symbols of the selected transmission data is modulated, and a transmission signal obtained by modulation of each of the symbols of the transmission data is transmitted.

With the reception apparatus and method according to another aspect of the present technology, a transmission signal transmitted from a transmission side is received, and a symbol of unknown data included in the received transmission signal is corrected on the basis of a symbol of known data included in the received transmission signal.

Effects of the Invention

According to the present technology, signal transmission or reception can be implemented. Moreover, according to the present technology, it is possible to transmit information with higher accuracy.

MODE FOR CARRYING OUT THE INVENTION

Hereinafter, embodiments of the present disclosure (hereinafter, embodiment(s)) will be described. Note that description will be presented in the following order.

1. First embodiment (position notification system)
2. Second embodiment (application example)
3. Third embodiment (anti-theft system)

1. First Embodiment

<Position Notification System>

Figure 1:
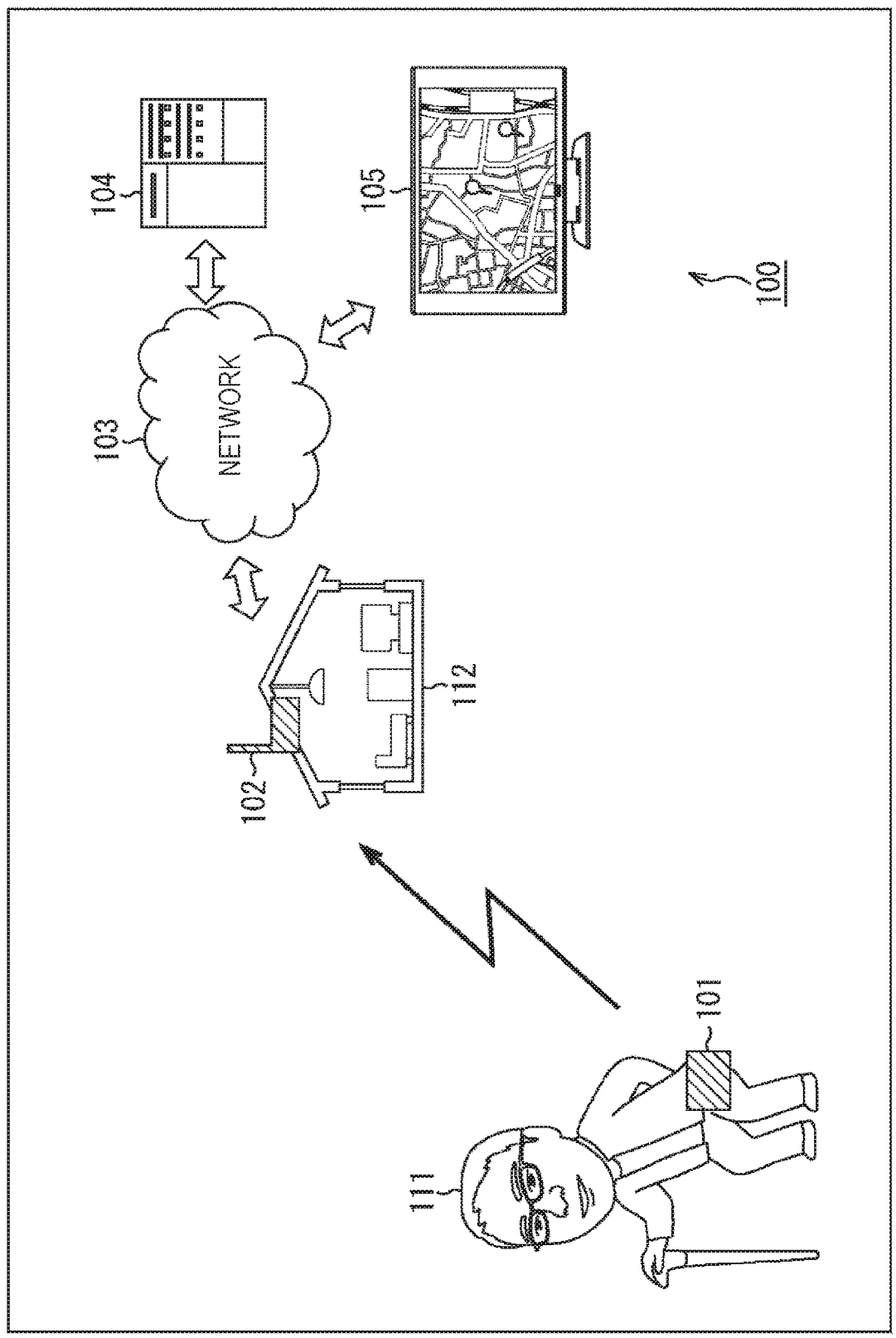
FIG. 1 is a diagram illustrating an exemplary main configuration of a position notification system.

FIG. 1 is a diagram illustrating a main configuration example of a position notification system as an embodiment of a signal transmission/reception system according to the present technology. A position notification system 100 illustrated in FIG. 1 is a system by which a transmission apparatus 101 provides notification of its own position.

The transmission apparatus 101 is an embodiment of a transmission apparatus according to the present technology and transmits position information indicating its own position as a radio signal. A high sensitivity reception apparatus 102 is an embodiment of a reception apparatus according to the present technology, and receives the radio signal to obtain position information of the transmission apparatus 101, and then transmits the position information to a server 104 via a network 103. That is, the high sensitivity reception apparatus 102 functions as a relay station that relays information transmitted from the transmission apparatus 101 to be transmitted to the server 104. The server 104 manages the position information of each of the transmission apparatuses 101. A terminal apparatus 105 operated by a user who needs to know the position of the transmission apparatus 101 accesses the server 104 via the network 103, obtains the position information of the transmission apparatus 101 from the server 104, and then, displays the position information together with map data or the like, for example, to notify the user of the position of the transmission apparatus 101.

For example, the transmission apparatus 101 may be carried by an object whose position needs to be grasped by the user. In the example of FIG. 1, an elderly person 111 carries the transmission apparatus 101. With reception or the like of a GNSS signal from a Global Navigation Satellite System (GNSS) satellite, for example, the transmission apparatus 101 can obtain its own position information (for example, latitude and longitude) as appropriate. The transmission apparatus 101 appropriately transmits the position information as a radio signal. Accordingly, the user can grasp the position of the elderly person 111 as a position monitoring object with operation on the terminal apparatus 105 as described above.

Note that the position monitoring object may be any object. For example, the objects may be a child, an animal such as a dog or a cat, an employee of a company, or the like. For example, the transmission apparatus 101 may be configured either as a dedicated apparatus, or be incorporated in a portable information processing apparatus such as a mobile phone and a smartphone.

The high sensitivity reception apparatus 102 may be installed at any location. For example, the apparatus may be installed at a roof or a rooftop surface of a structure 112 such as a building, a condominium, a house, and the like. The structure 112 is preferable because of its abundance in urban areas where the position monitoring object (for example, the elderly person 111) carrying the transmission apparatus 101 is likely to be active, and its easiness in installation. A residence of a position monitoring object is particularly suitable because it is highly probably that the position monitoring object be located in the vicinity of the residence. Moreover, it would be easier to find an installation location because it is easier to gain consent from the object, as compared with the case where a position notification service provider independently finds a place and installs the high sensitivity reception apparatus 102 at this place.

Furthermore, for example, in a case where the position monitoring object (or user) purchases or rents the high sensitivity reception apparatus 102 for installation, it is possible to reduce the load (cost) on the position notification service provider compared with a case where the position notification service provider independently installs the high sensitivity reception apparatus 102. That is, this would make it possible to install the high sensitivity reception apparatus 102 in larger number at a lower cost.

The server 104 can manage the position of the transmission apparatus 101 in a state where the transmission apparatus 101 is located within a communicable range of any of the high sensitivity reception apparatuses 102. In other words, the server 104 has difficulty in managing the position of the transmission apparatus 101 when the position of the transmission apparatus 101 is outside the communicable range of any of the high sensitivity reception apparatuses 102. Therefore, the wider a communicable range network of the high sensitivity reception apparatus 102 with respect to the transmission apparatus 101, the higher the accuracy in management of the position of the transmission apparatus 101 by the server 104. Here, the higher accuracy in management means managing the position of the transmission apparatus 101 in a wider range. That is, in order to widen the range enabling management of the position of the transmission apparatus 101, it would be more preferable to achieve longer possible distance of transmission and reception of radio signals between the transmission apparatus 101 and the high sensitivity reception apparatus 102 (that is, wider possible communicable range of each of the high sensitivity reception apparatuses 102). In addition, since the high sensitivity reception apparatuses 102 are installed at mutually different positions, the larger the number of the high sensitivity reception apparatuses 102, the more preferable. Furthermore, in view of the usefulness, it is preferable to set a region where the transmission apparatus 101 is located with higher probability as the communicable range of the high sensitivity reception apparatus 102.

Accordingly, in view of the position notification system 100, the larger the number of the high sensitivity reception apparatus 102, the higher the quality of services to be provided, and therefore preferable. In other words, a more useful system can be realized at a lower cost.

Note that the high sensitivity reception apparatus 102 may be installed on a movable object (also referred to as a moving body) such as an automobile, a motorbike, and a bicycle. That is, the position of the high sensitivity reception apparatus 102 may be variable.

The network 103 may be any communication network, that is, may be a wired communication network or a wireless communication network, or both of them.

Furthermore, the network 103 may be constituted by one communication network or a plurality of communication networks. For example, the network 103 may include the internet, a public telephone line network, a wide area communication network for a wireless mobile bodies, such as 3G or 4G networks, wireless communication networks for communication conforming to standards of a wide area network (WAN), a local area network (LAN), and the Bluetooth (registered trademark), a communication channel of a short-range radio communication such as near-field communication (NBC), a communication channel for an infrared communication, communication networks for wired communication conforming to the standards such as High-Definition Multimedia Interface (HDMI) and Universal Serial Bus (USB), and other communication networks or communication channels based on arbitrary communication standards.

The server 104 and the terminal apparatus 105 are information processing apparatuses configured to process information. The server 104 and the terminal apparatus 105 are communicably connected to the network 103, and can perform communication and information transfer with another communication apparatus connected to the network 103 via the network 103.

Figure 2:
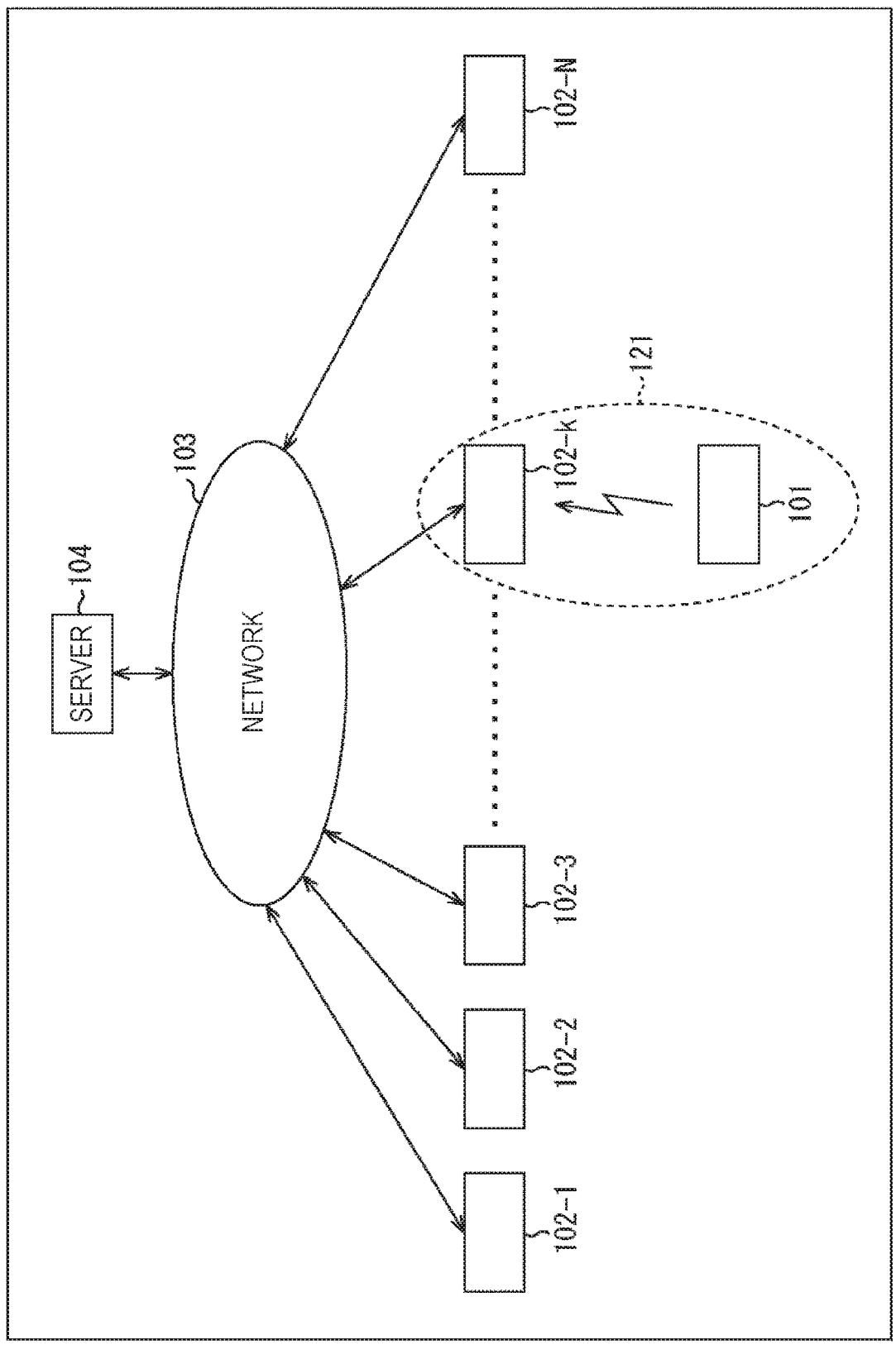
FIG. 2 is a diagram for illustrating an example of a state of position notification.

In such position notification system 100, the number of the transmission apparatus 101, the high sensitivity reception apparatus 102, the server 104, and the terminal apparatus 105 may be any number, and each may be provided in plurality. For example, as illustrated in FIG. 2, the position notification system 100 is assumed to include N (N is an arbitrary natural number) high sensitivity reception apparatus 102 installed at mutually different locations (namely, high sensitivity reception apparatus 102-1 to high sensitivity reception apparatus 102-N).

The transmission apparatus 101 may transmit a radio signal (position information) in any timing. For example, the transmission apparatus 101 may transmit the radio signal periodically or at an occurrence of a predetermined event (for example, after the transmission apparatus 101 has moved by a predetermined distance, arrival of a predetermined time, or the like).

In this case, the radio signal transmitted from the transmission apparatus 101 is received by the high sensitivity reception apparatus 102 located near the transmission apparatus 101. The transmission apparatus 101 transmits a radio signal from within a communicable range 121 of a high sensitivity reception apparatus 102-K (K is an integer being 1≤K≤N), and then, the high sensitivity reception apparatus 102-K receives the radio signal thereby obtaining the position information of the transmission apparatus 101, and supplies the obtained position information to the server 104 via the network 103 (relays the position information).

For example, in a case where the elderly person 111 (transmission apparatus 101) moves to another communicable range of another high sensitivity reception apparatus 102 and the transmission apparatus 101 transmits a radio signal, the high sensitivity reception apparatus 102 corresponding to the range relays position information in a similar manner. Therefore, the user can grasp the position of the elderly person 111 as long as the elderly person 111 (transmission apparatus 101) is located within the communicable range of any of the high sensitivity reception apparatuses 102.

The server 104 manages the position information of the transmission apparatus 101. In a case where there are a plurality of transmission apparatuses 101, the server 104 manages the position information of each of the transmission apparatuses 101. For example, the transmission apparatus 101 transmits its own identification information (ID) together with the position information. The server 104 stores and manages the position information in association with the ID of the transmission apparatus 101. Therefore, the server 104 can selectively provide the position information of the transmission apparatus 101 requested from the user (terminal apparatus 105). In addition, the server 104 may also manage which of the users is permitted to receive position information individually for each of the transmission apparatuses 101. In other words, the server 104 can provide the position information of each of the transmission apparatuses 101 selectively to the user who is permitted to receive the position information of the transmission apparatus 101.

Note that the server 104 may manage the position information of the transmission apparatus 101 in association with information other than the ID of the transmission apparatus 101. For example, the server 104 may store and manage the position information of the transmission apparatus 101 in association with time information or the like. With this configuration, the server 104 can manage and provide a history of the position information of the transmission apparatus 101.

Note that the time information may be transmitted from the transmission apparatus 101. For example, the transmission apparatus 101 may transmit the time information included in the GNSS signal together with the position information, as a radio signal.

Furthermore, the position information transmitted by the transmission apparatus 101 may be any information that can be managed as information indicating the position of the transmission apparatus 101 in the server 104, and thus, the position information may have any content. For example, the transmission apparatus 101 may transmit the GNSS signal (or the time information included in the GNSS signal) without obtaining the position information from the GNSS signal. In that case, the high sensitivity reception apparatus 102, the server 104, or the like, may obtain the position information of the transmission apparatus 101 using the GNSS signal or the time information. In addition, it is also allowable to separately provide another information processing apparatus (server or the like) that obtains the position information of the transmission apparatus 101 using the GNSS signal or the time information.

Furthermore, for example, the position of the transmission apparatus 101 may be obtained on the basis of the installation position of the high sensitivity reception apparatus 102 that receives the radio signal from the transmission apparatus 101. For example, in FIG. 2, the transmission apparatus 101 is located within the communicable range 121 of the high sensitivity reception apparatus 102. In such a case, the server 104 may recognize the relaying of the communication performed by the high sensitivity reception apparatus 102-K so as to estimate that the transmission apparatus 101 is located within the communicable range 121 of the high sensitivity reception apparatus 102-K and may manage a result of estimation as the position information. That is, in this case, the position of the transmission apparatus 101 is managed with a level of granularity represented by the number of the high sensitivity reception apparatuses 102 (size of the communicable range of each of the high sensitivity reception apparatus 102). In this case, it would be sufficient that the transmission apparatus 101 transmit at least its own ID as a radio signal.

Furthermore, for example, the distance between the high sensitivity reception apparatus 102 and the transmission apparatus 101 may be estimated from the radio wave strength or the like of the radio signal received by the high sensitivity reception apparatus 102, and then, the server 104 may manage the distance as position information as well. In other words, the server 104 may manage in which of the communicable ranges of the high sensitivity reception apparatuses 102 the transmission apparatus 101 is located, and may manage the distance between the high sensitivity reception apparatus 102 and the transmission apparatus 101. The estimation of the distance may be performed either on the high sensitivity reception apparatus 102 or on the server 104, or may be performed by a separately provided dedicated information processing apparatus (server or the like).

Furthermore, for example, in a case where the transmission apparatus 101 is located at a portion where the communicable ranges of the plurality of high sensitivity reception apparatuses 102 overlap with each other, that is, the radio signal transmitted by the transmission apparatus 101 is relayed by the plurality of high sensitivity reception apparatuses 102, the position of the transmission apparatus 101 may be estimated using trigonometry or the like. The estimation of the position may be performed either on the server 104 or by a separately provided dedicated information processing apparatus (server or the like), for example.

Each of the high sensitivity reception apparatuses 102 may be configured to relay information of any transmission apparatus 101 or may be configured to be able to relay information regarding the corresponding transmission apparatus 101 alone. For example, information transmitted from a certain transmission apparatus 101 may be configured to be relayed only by the high sensitivity reception apparatus 102 owned or managed by the owner (or manager) of the transmission apparatus 101. This owner (or manager) may also include businesses in addition to individuals. With this configuration, it is possible to avoid sharing the high sensitivity reception apparatus 102 by a plurality of users, making it possible to suppress a degradation of communication security, such as information leakage. Furthermore, the number of usable high sensitivity reception apparatuses 102 may be set according to the amount of fee paid by the user. This makes it possible to differentiate the quality of services to be provided in accordance with pricing.

<Intersymbol Interference>

One method for improving data reception accuracy in data transmission and reception using such a system would be a method in which the transmission side transmits a synchronization signal together with the data, and then, the reception side determines reception timings of data on the basis of the synchronization signal.

Figure 3:
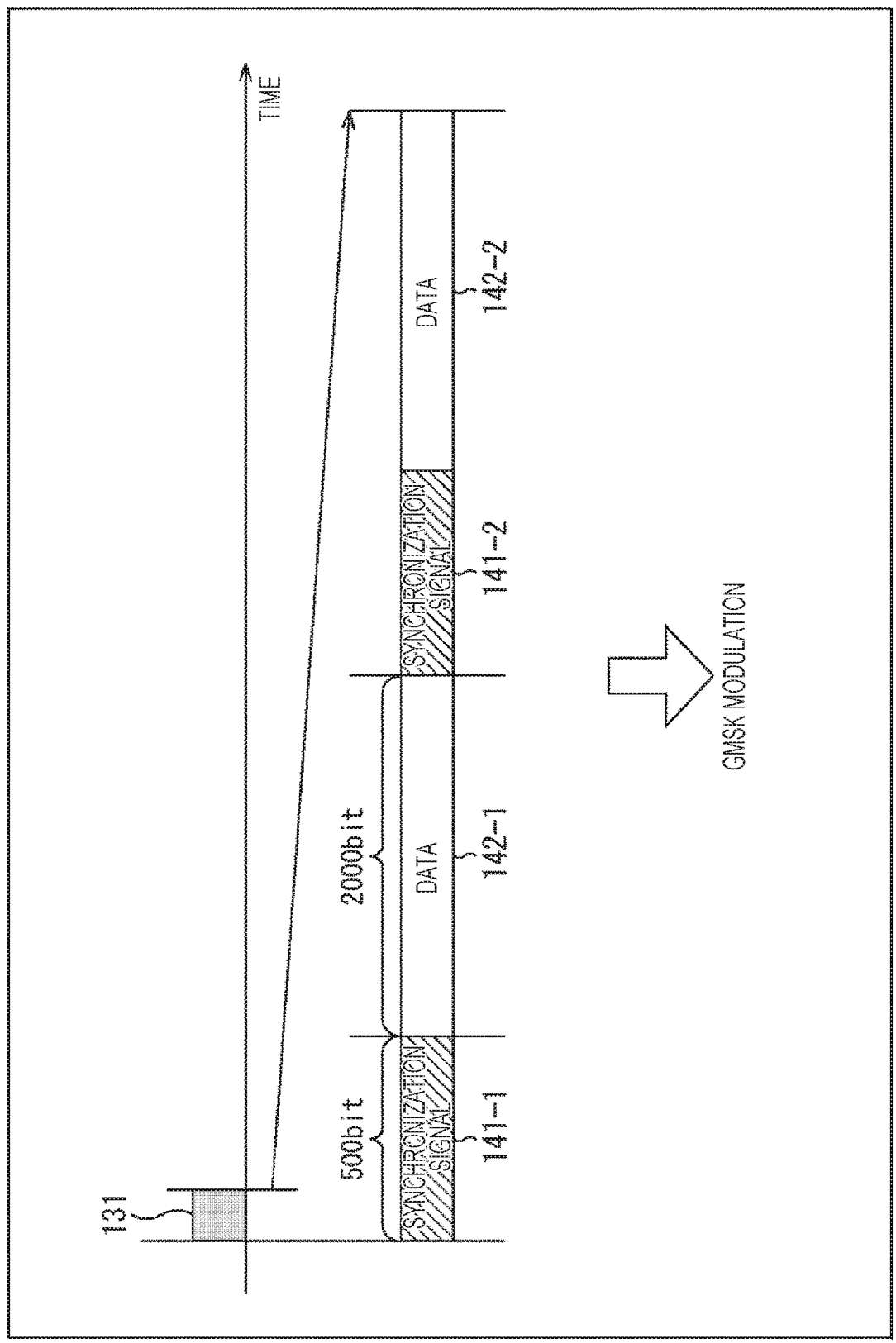
FIG. 3 is a diagram illustrating a main configuration example of transmission data.

For example, as illustrated in FIG. 3, a single frame transmission signal 131 (also referred to as a frame 131) is transmitted as a signal including 500-bit synchronization signal 141-1, 2000-bit data 142-1, 500-bit synchronization signal 141-2, and 2000-bit data 142-2.

Here, the synchronization signal 141-1 and the synchronization signal 141-2 are information known to the reception side, while the data 142-1 and the data 142-2 are information unknown to the reception side. That is, the synchronization signal 141-1 and the synchronization signal 141-2 are information known to the reception side, and thus is more detectable than the data 142-1 and the data 142-2. Therefore, for example, even in a case where the S/N ratio at the time of signal reception is too low to detect the data 142-1 and the data 142-2, it might be possible to detect the synchronization signal 141-1 and the synchronization signal 141-2 in some cases.

Then, since the synchronization signal 141-1, the data 142-1, the synchronization signal 141-2, and the data 142-2 are sequentially transmitted as illustrated in FIG. 3, detection of the synchronization signal 141-1 and the synchronization signal 141-2 enables estimation of the reception timings of the data 142-1 and the data 142-2 from the reception timings of the detected signals. With the reception timings specified in this manner, detection of the data 142-1 and the data 142-2 would become easier. That is, the data 142-1 and the data 142-2 can be detected with higher sensitivity.

Figure 4:
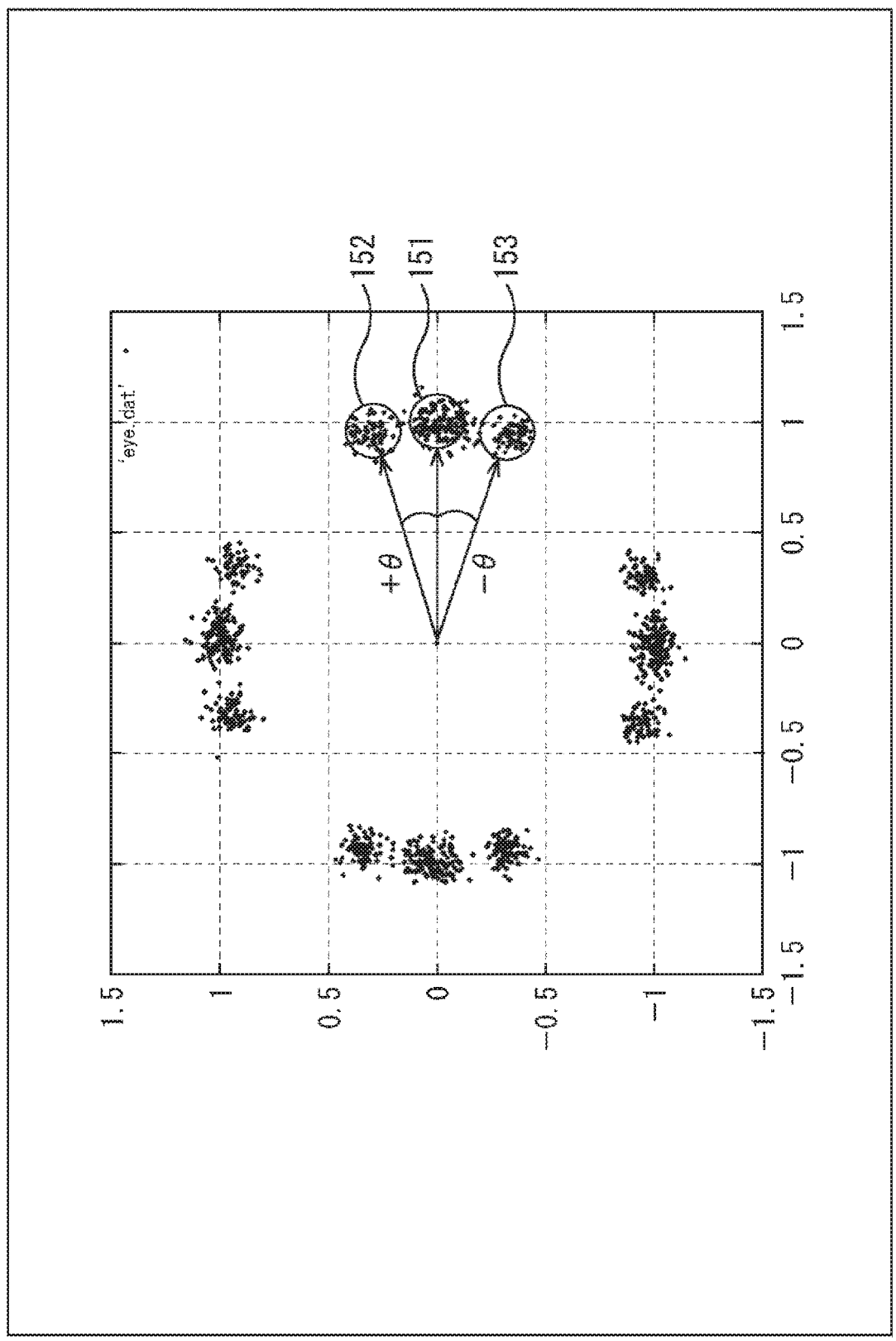
FIG. 4 is a diagram illustrating an example of a reception result.

In practice, however, such a single frame transmission signal 131 is modulated (Gaussian filtered minimum shift keying (GMSK) modulation, for example) and then transmitted. That is, the single frame transmission signal 131 undergoes GMSK modulation for each of symbols and then transmitted. On the reception side, the transmission signal is received and then demodulated with a demodulation scheme (also referred to as GMSK demodulation) corresponding to the GMSK modulation, leading to acquisition of data of each of symbols. FIG. 4 illustrates an example of a state of constellation of a result of demodulation. Each of plots (also referred to as signal points) illustrated in the constellation of FIG. 4 indicates a detected symbol. For example, in GMSK modulation, symbols are detected on the Q axis (vertical direction in the figure, also referred to as the quadrature axis) and the I axis (lateral direction in the figure, also referred to as the in-phase axis).

In practice, however, as illustrated in the constellation of FIG. 4, intersymbol interference occurs and the symbol is detected at an angle shifted from each of the axes. For example, a symbol that should be ideally detected on the I axis, such as a symbol surrounded by a circle 151, is detected at an angle shifted by −θ from the I axis like a symbol surrounded a circle 152, or the symbol is detected at an angle shifted by −θ from the I axis like the symbol surrounded by a circle 153. This is due to intersymbol interference (influence by one or both of an immediately preceding symbol and an immediately succeeding symbol). For example, in a case where both the immediately preceding symbol and the immediately succeeding symbol are "+1", the symbol might be detected at an angle shifted by +θ from the I axis in some cases. In another exemplary case where both the immediately preceding symbol and the immediately succeeding symbol are "−1", the symbol might be detected at an angle shifted by −θ from the I axis in some cases.

An occurrence of such intersymbol interference would make is difficult to obtain a correct demodulation result, leading to a decrease in accuracy of data transmission.

<Transmission Apparatus>

To cope with this, one method is to select one of known data and unknown data for each of symbols, as transmission data, while selecting a symbol of the known data for a reception side at one or both of timings of immediately before and immediately after selection of a symbol of unknown data for the reception side; modulate each of the symbols of the selected transmission data; and transmit a transmission signal obtained by modulation of each of the symbols of the transmission data.

For example, the transmission apparatus 101 includes: a selection unit that selects one of known data and unknown data for each of symbols, as transmission data, while selecting a symbol of the known data for a reception side at one or both of timings of immediately before and immediately after selection of a symbol of unknown data for the reception side; a modulation unit that modulates each of the symbols of the transmission data selected by the selection unit; and a transmission unit that transmits a transmission signal obtained by modulation of each of the symbols of the transmission data performed by the modulation unit.

With this configuration, it is possible on the reception side to suppress the influence of intersymbol interference and perform demodulation with higher accuracy. That is, information can be transmitted with higher accuracy.

Figure 5:
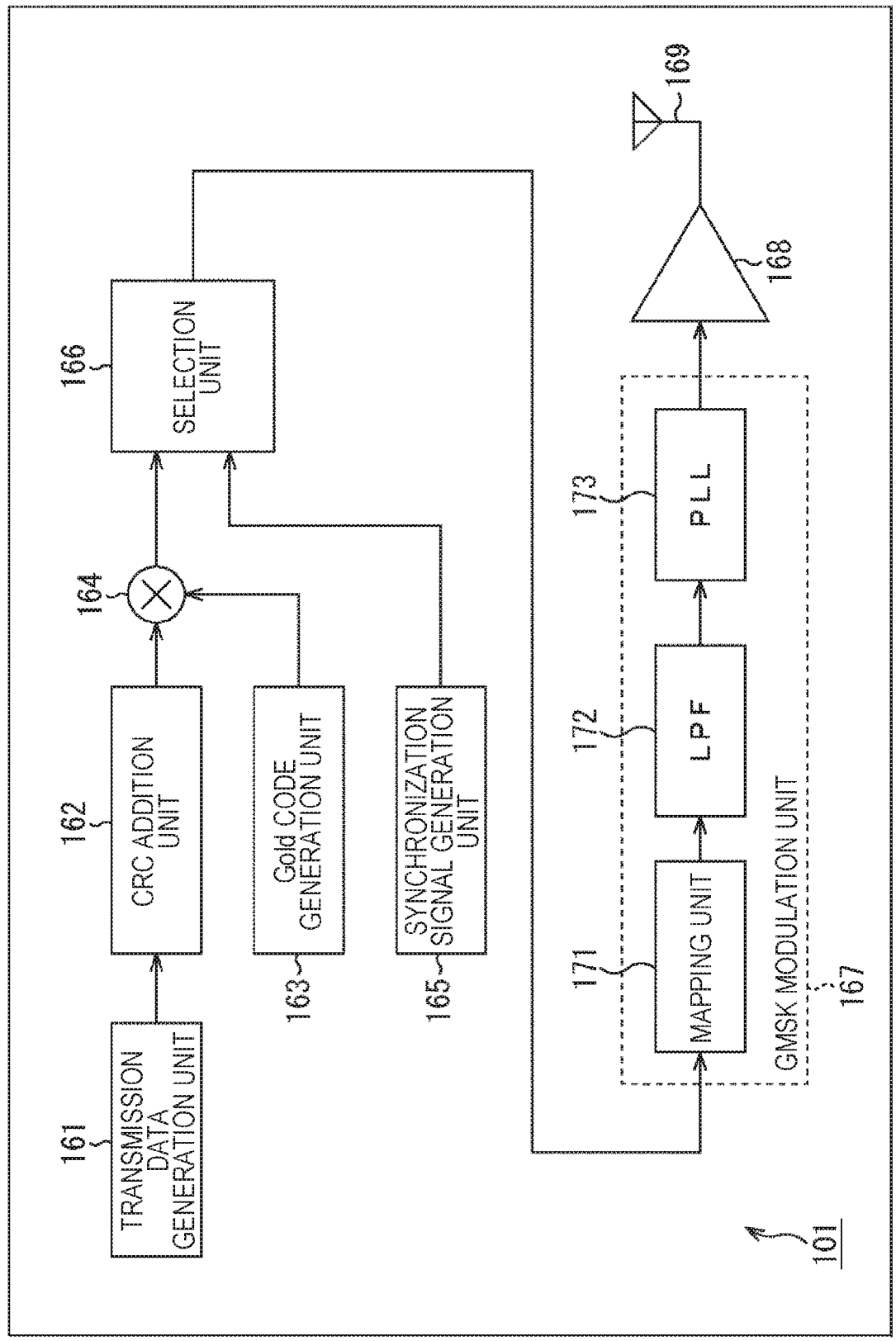
FIG. 5 is a block diagram illustrating a main configuration example of a transmission apparatus.

A radio signal may be transmitted received between the transmission apparatus 101 and the high sensitivity reception apparatus 102 in any manner and may conform to any communication standard. For example, it is allowable to apply a method to use a frequency band including 925 MHz (also referred to as a 920 MHz band) enabling long-distance communication. FIG. 5 is a block diagram illustrating a main configuration example of the transmission apparatus 101. As illustrated in FIG. 5, the transmission apparatus 101 includes a transmission data generation unit 161, a cyclic redundancy check (CRC) addition unit 162, a Gold code generation unit 163, a multiplication unit 164, a synchronization signal generation unit 165, a selection unit 166, a Gaussian filtered minimum shaft keying (GMSK) modulation unit 167, an amplifier 168, and an antenna 169.

The transmission data generation unit 161 generates data being information to be transmitted as a radio signal. This data may be any type of information. For example, it is possible to allow the transmission data generation unit 161 to receive a global navigation satellite system (GNSS) signal from a GNSS satellite, use the GNSS signal to generate position information (for example, latitude and longitude, etc.) indicating a current position of the transmission apparatus 101, and then generate data including the position information. Furthermore, for example, the transmission data generation unit 161 may generate data including a GNSS signal (or time information included in the GNSS signal) received from the GNSS satellite. The transmission data generation unit 161 supplies the generated data to the CRC addition unit 162.

The CRC addition unit 162 adds a cyclic redundancy check code (CRC) for error detection to the data supplied from the transmission data generation unit 161. The cyclic redundancy check code may be any type of code and may have any data length. The CRC addition unit 162 supplies the data to which the cyclic redundancy check code is added to the multiplication unit 164.

The Gold code generation unit 163 generates a pseudo random number sequence to be added to transmission data TM. This pseudo random number sequence may be any data sequence and may have any data length. For example, the Gold code generation unit 163 may generate a bit string of a predetermined pattern having a length of 256 bits as the pseudo random number sequence. For example, the Gold code generation unit 163 may be configured with two maximum length sequence (M sequence) generators. The Gold code generation unit 163 supplies the generated pseudo random number sequence to the multiplication unit 164.

The multiplication unit 164 multiplies the data to which the cyclic redundancy check code is added supplied from the CRC addition unit 162 by the pseudo random number sequence supplied from the Gold code generation unit 163 to generate data to which a pseudo random number sequence and cyclic redundancy check code have been added. The multiplication unit 164 supplies the obtained data to the selection unit 166.

The synchronization signal generation unit 165 generates a synchronization signal of a predetermined synchronization pattern. This synchronization pattern may be any pattern and may have any data length. Note that this synchronization pattern is a pattern known to the reception side (for example, the high sensitivity reception apparatus 102). The synchronization signal generation unit 165 supplies the synchronization signal to the selection unit 166.

The selection unit 166 appropriately selects an input to generate a transmission signal. That is, although the details will be described below, the selection unit 166 selects the data supplied from the multiplication unit 164 or the synchronization signal supplied from the synchronization signal generation unit 165, as a transmission signal. The selection unit 166 supplies the transmission signal obtained as described above to the GMSK modulation unit 167.

The GMSK modulation unit 167 applies GMSK modulation on the transmission signal. The GMSK modulation unit 167 include a mapping unit 171, an low-pass filter (LPF) 172, and a phase locked loop (PLL) 173, for example. The mapping unit 171 maps a value of each of symbols of the transmission signal. For example, the mapping unit 171 maps a symbol of value "0" to "+1" and maps symbol of value "1" to "−1". The mapping unit 171 supplies a signal in which each of symbols have been mapped, to the LPF 172.

The LPF 172 applies a low-pass filter to the supplied signal to smooth the frequency change so as to obtain Gaussian characteristic. With such filtering, the GMSK modulation unit 167 can achieve narrowband modulation. The LPF 172 supplies the filtered signal to the PLL 173.

The PLL 173 modulates a carrier signal (carrier wave) of a predetermined frequency (for example, 920 MHz) in accordance with a signal supplied from the LPF 172, and supplies the modulated signal as a transmission signal that has undergone GMSK modulation, to the amplifier 168.

The amplifier 168 amplifies the supplied transmission signal and transmits the amplified signal as a radio signal via the antenna 169.

In such a transmission apparatus 101, the selection unit 166 alternately selects the synchronization signal supplied from the synchronization signal generation unit 165 and the data supplied from the multiplication unit 164 for each of symbols. Symbol is a processing unit of modulation and represents a data amount (number of bits) for one modulation process. Therefore, the data amount (number of bits) of one symbol is determined by the modulation scheme. That is, this is information shared (at least preliminarily shared before start of data transmission) by the transmission side (modulation side, for example, the transmission apparatus 101) and the reception side (demodulation side, for example, the high sensitivity reception apparatus 102).

Figure 6:
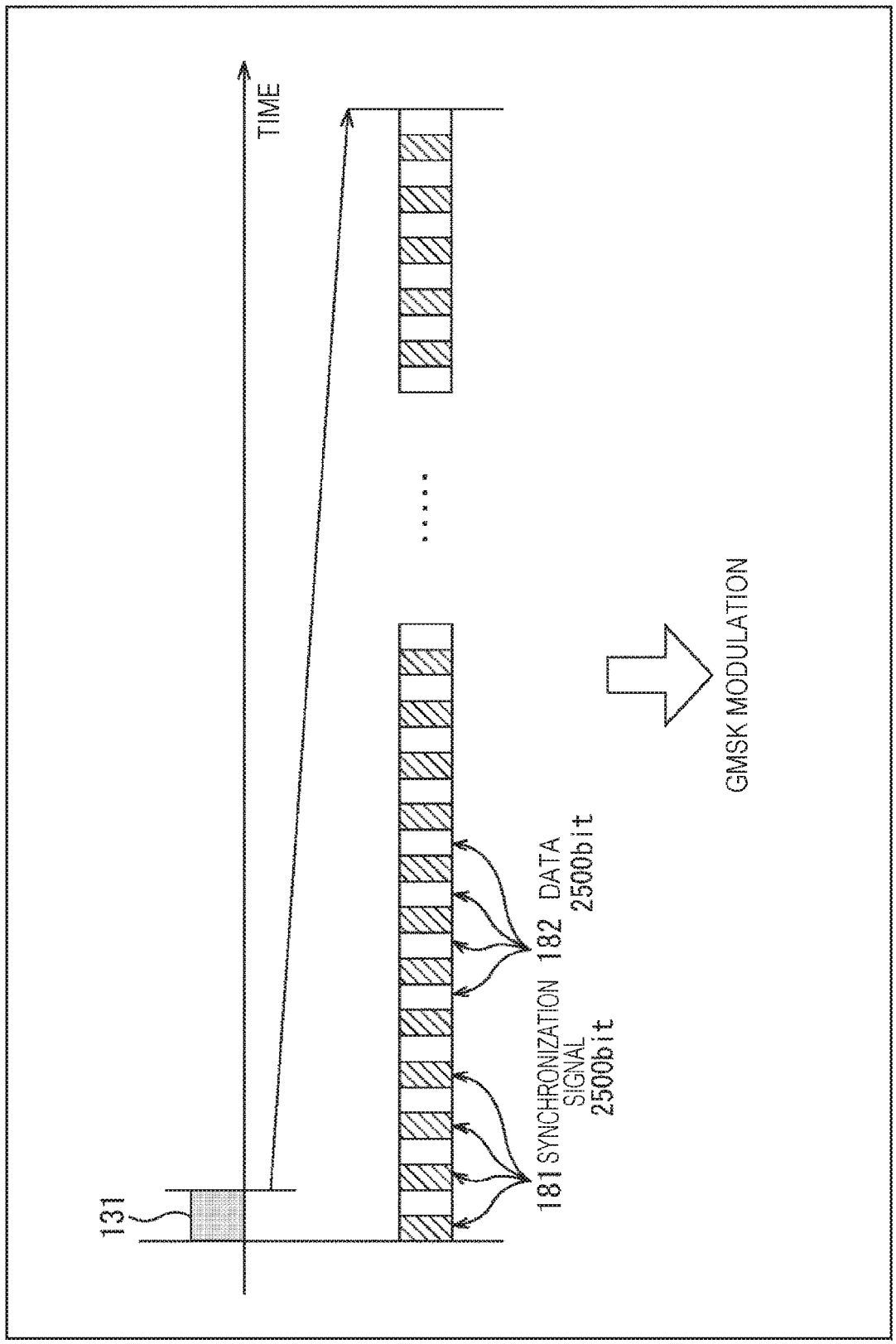
FIG. 6 is a diagram illustrating a main configuration example of transmission data.

FIG. 6 illustrates an example of the transmission signal selected and generated in this manner. As illustrated in FIG. 6, the transmission signal in one frame includes a synchronization signal 181 and data 182 alternately arranged for each of symbols. This transmission signal undergoes GMSK modulation and then is transmitted. With such configuration of the transmission signal, it is possible to modulate the symbol of the synchronization signal to be arranged on the Q axis and the symbol of data to be arranged on the I axis, for example.

As described above, the synchronization signal is information also known to the reception side, and thus, the position of the symbol of the synchronization signal is also known in the constellation. In addition, the reception timing of the symbol of the synchronization signal is known, the reception timing of the symbol of the data is also known. More specifically, alternate detection of the symbol of the synchronization signal and the symbol of the data is known. This makes it possible to easily identify the symbol of data.

Figure 7:
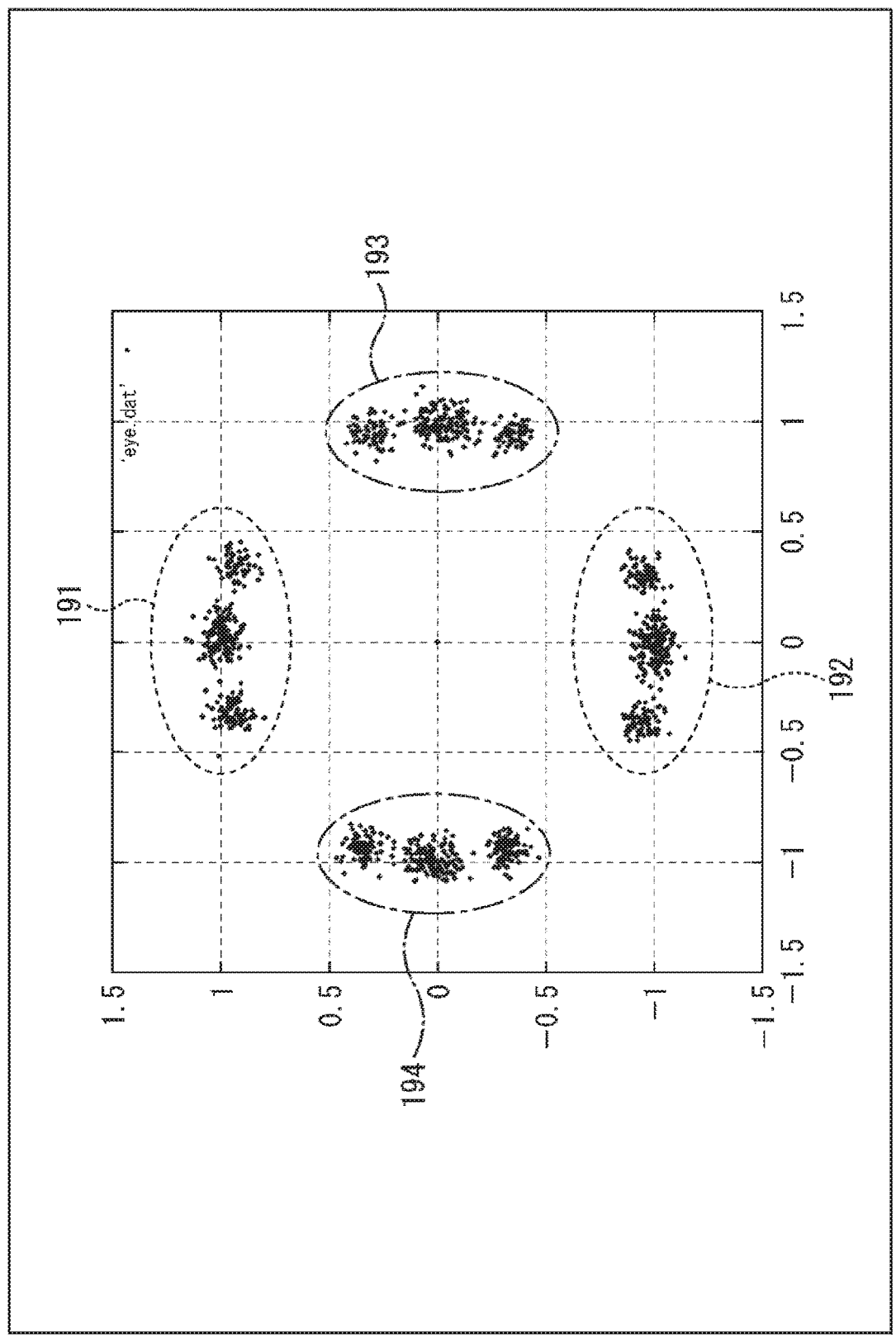
FIG. 7 is a diagram illustrating an example of a reception result.

FIG. 7 illustrates an example of a demodulation result obtained on the reception side (for example, the high sensitivity reception apparatus 102) that receives the transmission signal configured as illustrated in FIG. 6. In this case, the symbols of the synchronization signal are arranged on the Q axis by the GMSK modulation, and thus, signal points surrounded by a dotted line 191 and signal points surrounded by a dotted line 192 are symbols of the synchronization signal in the constellation of FIG. 7. Furthermore, in this case, the symbols of the data are arranged on the I axis by the GMSK modulation, and thus, signal points surrounded by a one-dot chain line 193 and signal points surrounded by a one-dot chain line 194 are symbols of the data in the constellation of FIG. 7.

When the symbol of the synchronization signal is known, the symbols immediately before and immediately after the symbol of the data are known. That is, it is known how the phase of the symbol of data changes due to the intersymbol interference. In other words, how to correct the symbol of the data in order to suppress the influence of intersymbol interference can be obtained on the basis of the symbols of the synchronization signal immediately before and immediately after the symbol of data.

That is, the selection unit 166 alternately selects the synchronization signal and the data for each of symbols, making it possible to suppress the influence of the intersymbol interference and to achieve transmission of information with higher accuracy.

<Flow of Transmission Processing>

Figure 8:
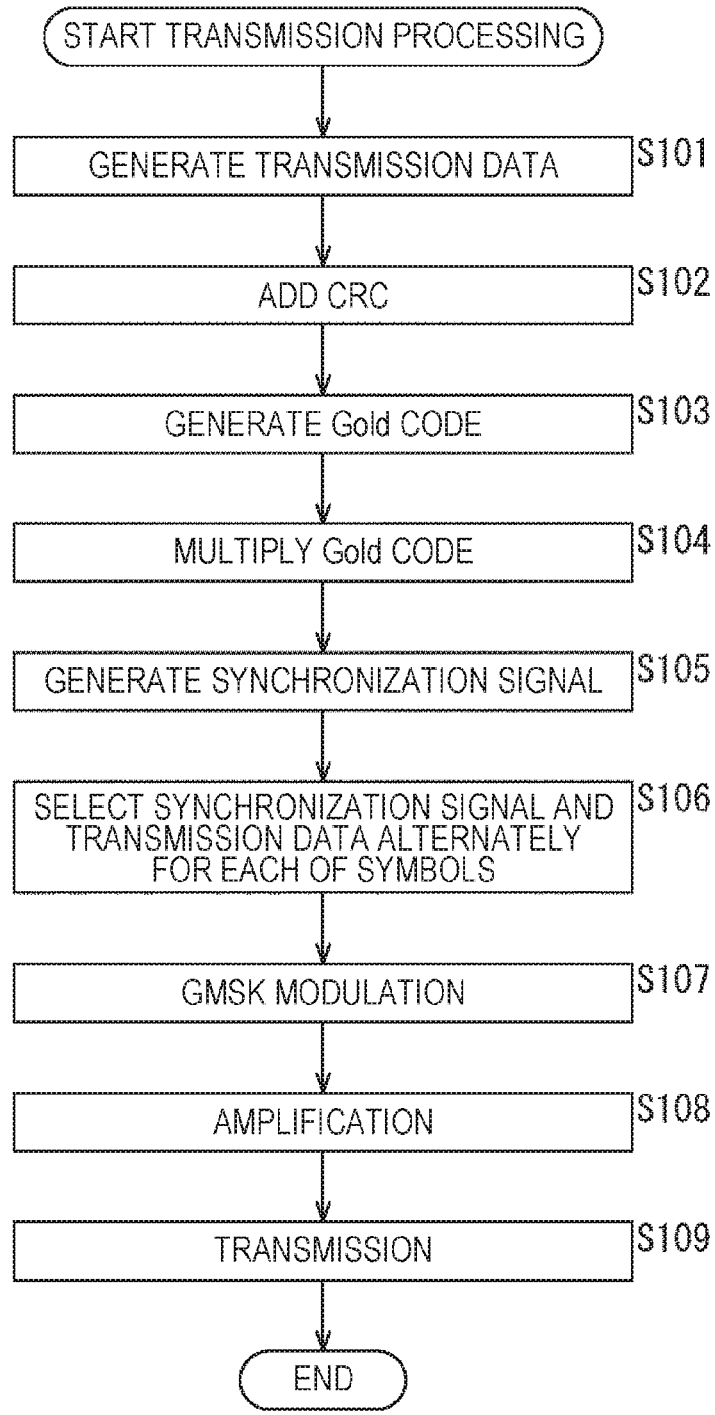
FIG. 8 is a flowchart illustrating an exemplary flow of transmission processing.

An example of a flow of transmission processing executed by such transmission apparatus 101 will be described with reference to the flowchart of FIG. 8.

When the transmission processing is started, the transmission data generation unit 161 of the transmission apparatus 101 generates transmission data in step S101. The transmission data may be generated by itself or may be obtained from the outside. In step S102, the CRC addition unit 162 adds CRC to the transmission data generated in step S101.

In step S103, the Gold code generation unit 163 generates a Gold code. In step S104, the multiplication unit 164 multiplies the transmission data to which the CRC has been added in step S102 with the Gold code generated in step S103.

In step S105, the synchronization signal generation unit 165 generates a synchronization signal. This synchronization signal is information also known to the reception side.

In step S106, the selection unit 166 alternately selects the synchronization signal generated in step S105 and the transmission data multiplied by the Gold code in step S104 for each of symbols, and generates a transmission signal. In step S107, the GMSK modulation unit 167 applies GMSK modulation on the transmission signal generated in step S106.

In step S108, the amplifier 168 amplifies the transmission signal that has undergone GMSK modulation in step S107, and transmits the amplified transmission signal as a radio signal via the antenna 169 in step S109.

With completion of processing of step S109, transmission processing finishes. The transmission apparatus 101 executes the transmission processing as described above for each of the frames.

With such processing, it is possible to have a transmission signal configuration in which the synchronization signal and the transmission data are alternately arranged for each of symbols as in the example illustrated in FIG. 6, enabling suppression of influence of the intersymbol interference and transmission of information with higher accuracy.

<High Sensitivity Reception Apparatus>

Next, the high sensitivity reception apparatus 102 will be described. Here, the high sensitivity reception apparatus 102 of FIG. 1 receives the transmission signal transmitted from the transmission side, demodulates the received transmission signal, and corrects the symbol of unknown data included in a result of demodulation on the basis of the symbol of known data included in the result of demodulation obtained by demodulation.

For example, the high sensitivity reception apparatus 102 includes: a reception unit that receives a transmission signal transmitted from a transmission side; a demodulation unit that demodulates the transmission signal received by the reception unit; and a correction unit that corrects a symbol of unknown data included in a result of demodulation on the basis of the symbol of known data included in the result of demodulation obtained by demodulation performed by the demodulation unit.

With such configuration, it is possible on the reception side to suppress the influence of intersymbol interference and perform demodulation with higher accuracy. That is, it is possible to achieve further accurate information transmission.

Figure 9:
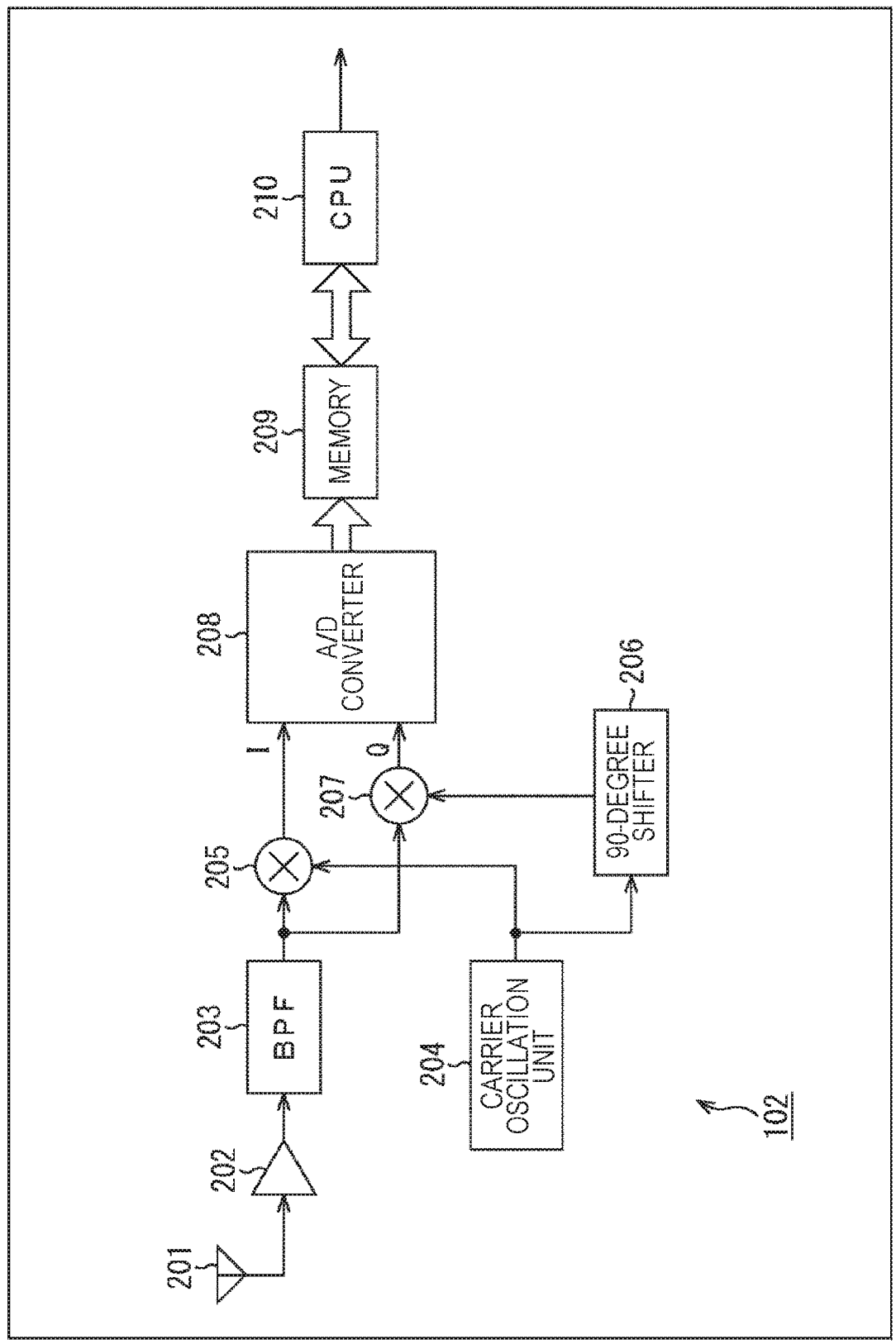
FIG. 9 is a block diagram illustrating a main configuration example of a high sensitivity reception apparatus.

FIG. 9 is a diagram illustrating a main configuration example of the high sensitivity reception apparatus 102. As illustrated in FIG. 9, the high sensitivity reception apparatus 102 includes an antenna 201, a low noise amplifier 202, a band pass filter (BPS) 203, a carrier oscillation unit 204, a multiplication unit 205, a 90-degree shifter 206, a multiplication unit 207, an analog/digital (A/D) converter 208, a memory 209, and a central processing unit (CPU) 210.

The low noise amplifier 202 receives a radio signal (for example, a transmission signal transmitted from the transmission apparatus 111) via the antenna 201, amplifies the received signal, and supplies the amplified received signal to the BPF 203. The BPS 203 removes unnecessary frequency components from the received signal and supplies a result to the multiplication unit 205 and the multiplication unit 207. The carrier oscillation unit 204 generates a signal having a carrier frequency of a predetermined frequency to be used in transmission and reception. For example, in a case of receiving a signal transmitted in the 920 MHz band, the carrier oscillation unit 204 oscillates at 920 MHz and supplies an oscillation signal (carrier signal) to the multiplication unit 205 and the 90-degree shifter 206.

The multiplication unit 205 multiplies the received signal supplied from the BPF 203 by the carrier signal supplied from the carrier oscillation unit 204 to generate a baseband In-phase signal (I signal). The multiplication unit 205 supplies the generated I signal to the A/D converter 208. The 90-degree shifter 206 applies 90-degree shift on the phase of the carrier signal supplied from the carrier oscillation unit 204. The 90-degree shifter 206 supplies the phase-shifted carrier signal to the multiplication unit 207. The multiplication unit 207 multiplies the reception signal supplied from the BPF 203 by the 90-degree phase-shifted carrier signal supplied from the 90-degree shifter 206 to generate a baseband quadrature signal (Q signal). The multiplication unit 207 supplies the Q signal to the A/D converter 208.

The A/D converter 208 applies A/D conversion on each of the supplied I signal and Q signal, and supplies digital data of these signals to the memory 209 for storage. The conversion rate of the A/D converter 208 needs to exceed the chip rate used for transmission. For example, in a case where the transmission with a chip rate of 200K/s has been performed with $\Delta=5$ μs, the A/D converter 208 needs to perform A/D conversion at a conversion rate of at least 200 KHz or more.

The memory 209 has a predetermined storage medium, obtains digital data of the I signal and the Q signal supplied from the A/D converter 208, and stores the data in the storage medium. The storage medium may be of any type, for example, a semiconductor memory, a magnetic recording medium such as a hard disk, or any other storage medium. In a case where A/D conversion has been performed for 30 seconds at 8-bit precision, at double conversion rate (400 KHz) in the A/D converter 208, the memory 209 accumulates digital data of 24 megabytes (24 Mbytes) containing I and Q signals.

The CPU 210 reads out the digital data of the I signal and the Q signal accumulated in the memory 209, and performs processing related to demodulation of the digital data.

<Functional Block of CPU>

Figure 10:
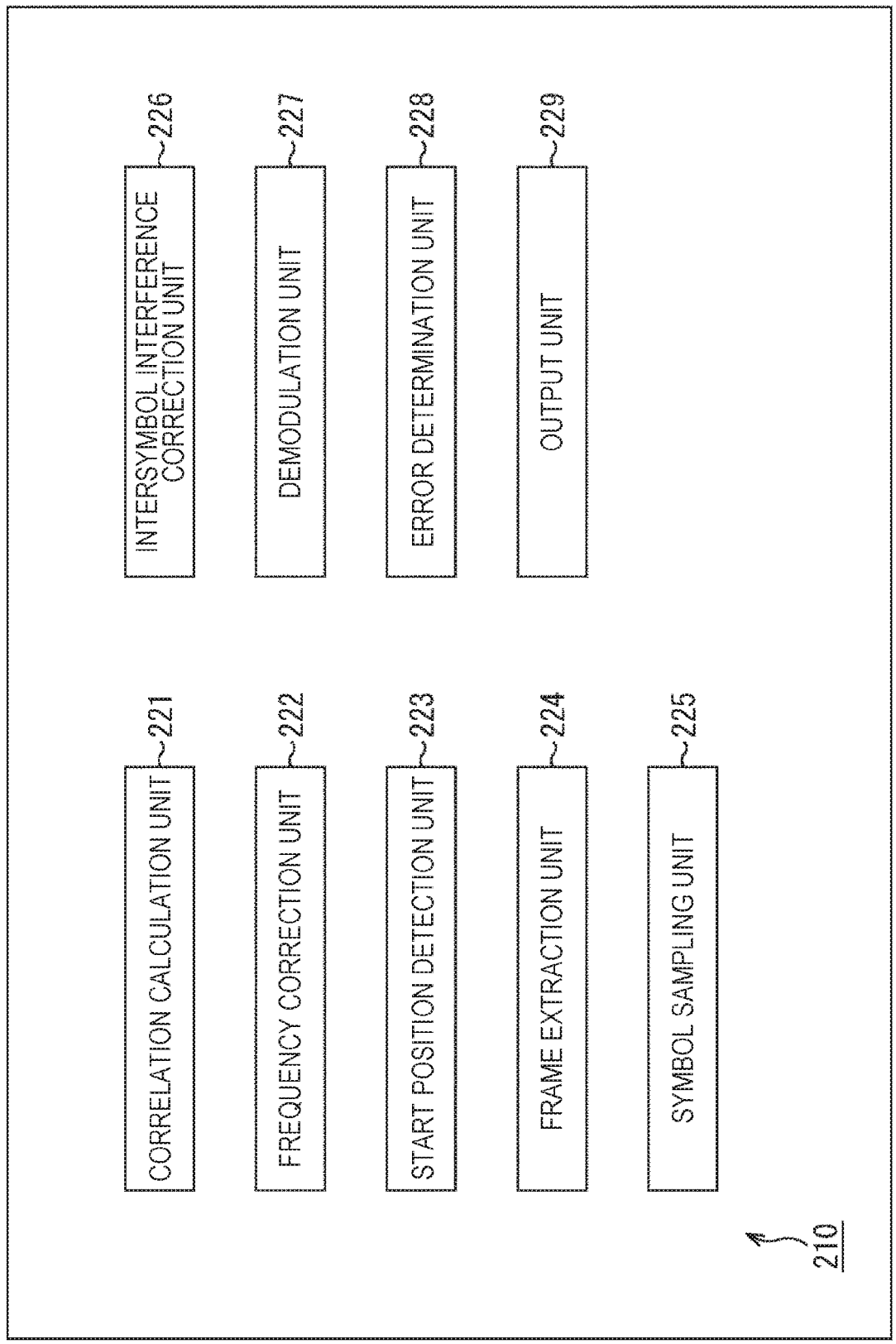
FIG. 10 is a functional block diagram illustrating exemplary functions implemented by a CPU.

FIG. 10 is a functional block diagram illustrating an exemplary configuration of main functions implemented by the CPU 210. As illustrated in FIG. 10, the CPU 210 includes functional blocks such as a correlation calculation unit 221, a frequency correction unit 222, a start position detection unit 223, a frame extraction unit 224, a symbol sampling unit 225, an intersymbol interference correction unit 226, a demodulation unit 227, an error determination unit 228, and an output unit 229. That is, the CPU 210 executes a program and thereby implementing functions represented by these functional blocks.

The correlation calculation unit 221 performs processing related to calculation for obtaining correlation between the received signal and the synchronization signal. The frequency correction unit 222 performs processing related to frequency correction. The start position detection unit 223 performs processing related to detection of a frame start position. The frame extraction unit 224 performs processing related to signal extraction for one frame. The symbol sampling unit 225 performs processing related to sampling. The intersymbol interference correction unit 226 performs processing related to correction for suppressing the influence of intersymbol interference. The demodulation unit 227 performs processing related to demodulation. The error determination unit 228 performs processing related to error determination. The output unit 229 performs processing related to signal output.

<Flow of Reception Processing>

Next, processing executed in the high sensitivity reception apparatus 102 will be described. First, an example of a flow of a reception processing as processing for receiving a radio signal by the high sensitivity reception apparatus 102 will be described with reference to the flowchart of FIG. 11.

When the reception processing is started, the low noise amplifier 202 receives in step S201 the radio signal (transmission signal) transmitted from the transmission apparatus 101 via the antenna 201. Note that in a case where the radio signal cannot be received, the reception processing is finished.

In step S202, the low noise amplifier 202 amplifies the reception signal which is the radio signal received in step S201.

In step S203, the BPF 203 removes unnecessary frequency components from the received signal amplified in step S202.

In step S204, the carrier oscillation unit 204 oscillates at a predetermined frequency to generate a carrier signal.

In step S205, the multiplication unit 205 multiplies the received signal from which unnecessary frequency components have been removed in step S203 by the carrier signal generated in step S204, thereby generating the I signal.

In step S206, the 90-degree shifter 206 applies 90-degree shift on the phase of the carrier signal generated in step S204. Then, the multiplication unit 207 multiplies the received signal from which unnecessary frequency components have been removed in step S203 by the 90-degree phase shifted carrier signal, thereby generating the signal.

In step S207, the A/D converter 208 applies A/D conversion on each of the I signal generated in step S205 and the Q signal generated in step S206.

In step S208, the memory 209 stores each of the digital data of the I signal and digital data of the Q signal generated in step S207.

In step S209, the CPU 210 reads out digital data of the I signal and digital data of the Q signal from the memory 209, and performs signal processing on the data.

With completion of processing of step S209, reception processing finishes.

<Flow of Signal Processing>

Figure 11:
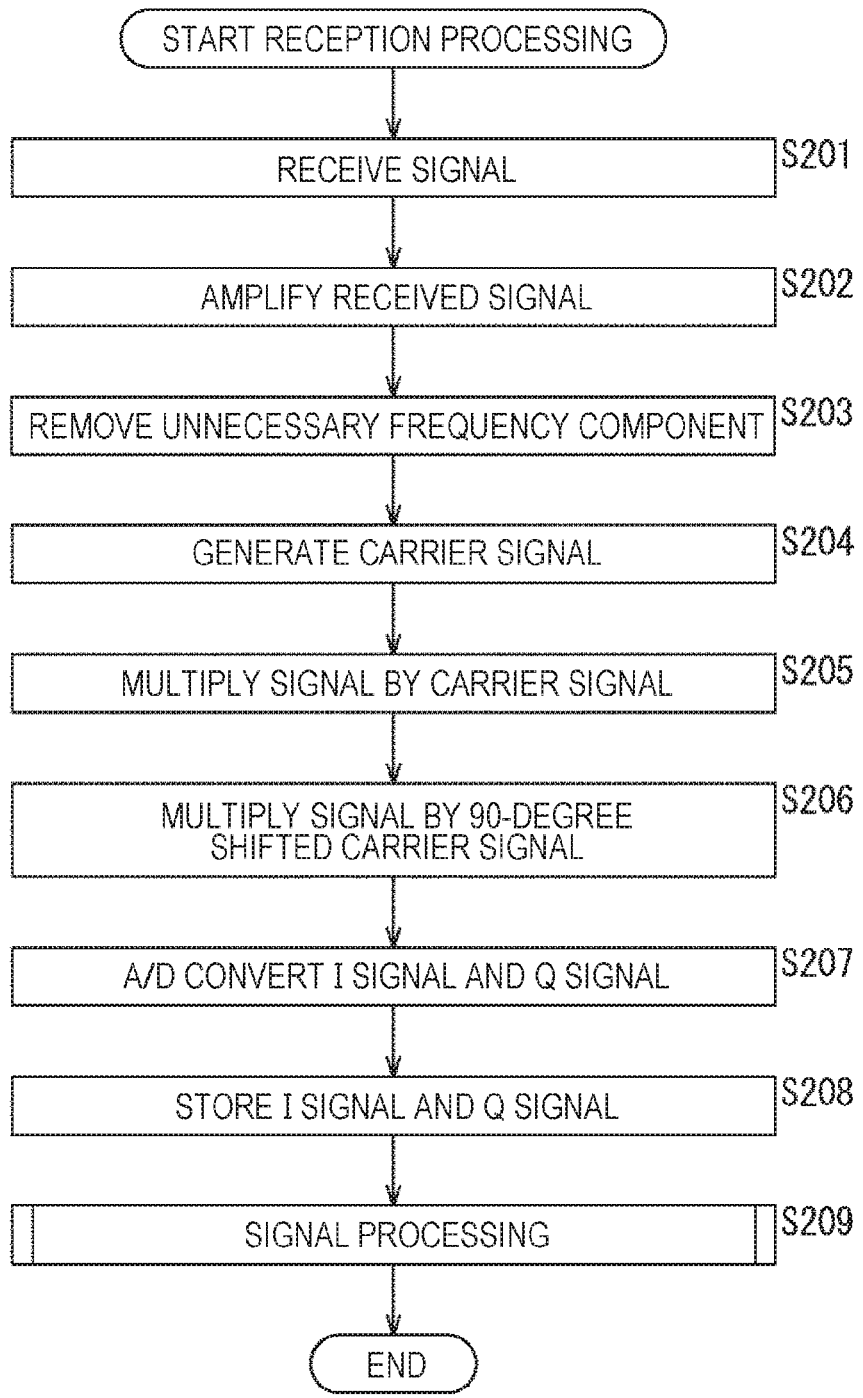
FIG. 11 is a flowchart illustrating an exemplary flow of reception processing.

Next, an exemplary signal processing flow executed in step S209 in FIG. 11 will be described with reference to the flowchart in FIG. 12.

When the signal processing is started, a correlation calculation unit 221 of the CPU 210 calculates the correlation between the reception signal and the synchronization signal in step S221, and obtains a correlation value peak maximizing the correlation value. In step S222, the frequency correction unit 222 obtains frequency deviation maximizing a correlation value peak obtained in step S221, and performs frequency correction.

In step S223, the start position detection unit 223 detects the frame start position from the correlation value peak obtained in step S221 in step S224, the frame extraction unit 224 extracts the I signal and the Q signal for one frame from the frame start position detected in step S223.

In step S225, the symbol sampling unit 225 samples, at symbol intervals, the I signal and Q signal of one frame extracted in step S224.

In step S226, the intersymbol interference correction unit 226 corrects intersymbol interference of data.

In step S227, the demodulation unit 227 demodulates the corrected data. More specifically, the demodulation unit 227 demodulates the corrected data using a demodulation scheme corresponding to GMK modulation (also referred to as GMSK demodulation), rearranges the data/synchronization signals for each of symbols obtained, and extracts data. In step S228, the error determination unit 228 performs CRC check on the demodulated data. In step S229, the error determination unit 228 determines whether or not the demodulated data has passed inspection (CRC OK?) as a result of processing in step S228. In a case where it is determined that the data has passed the inspection, the processing proceeds to step S230.

In step S230, the output unit 229 outputs data. At completion of processing in step S230, the signal processing is finished and the processing returns to FIG. 11. In contrast, in a case where it is determined in step S229 that the data has not passed the inspection, the processing of step S230 will be skipped and the signal processing is terminated, and then, the processing returns to FIG. 11.

<Correction of Intersymbol Interference>

Figure 12:
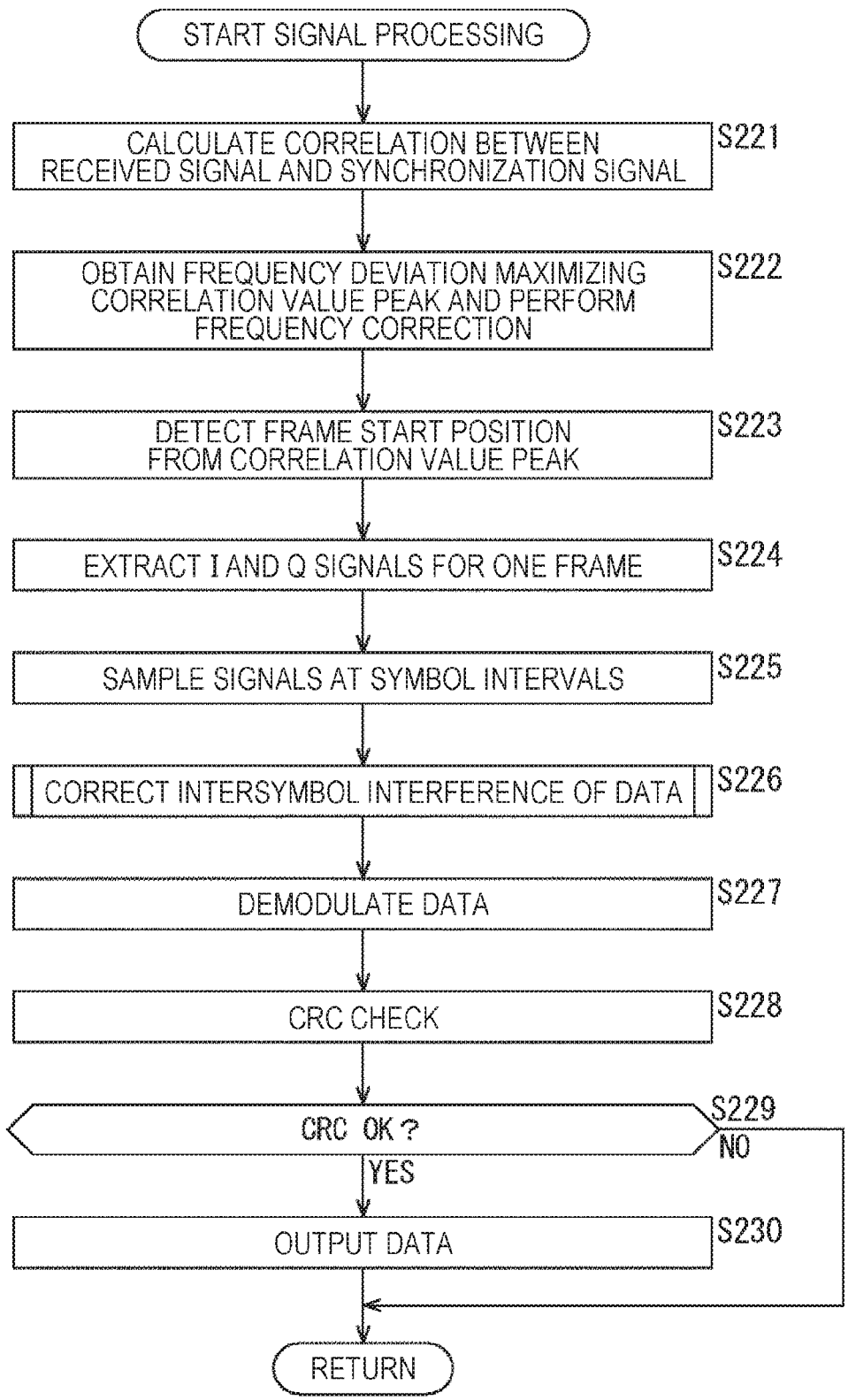
FIG. 12 is a flowchart illustrating an exemplary flow of signal processing.
Figure 13:
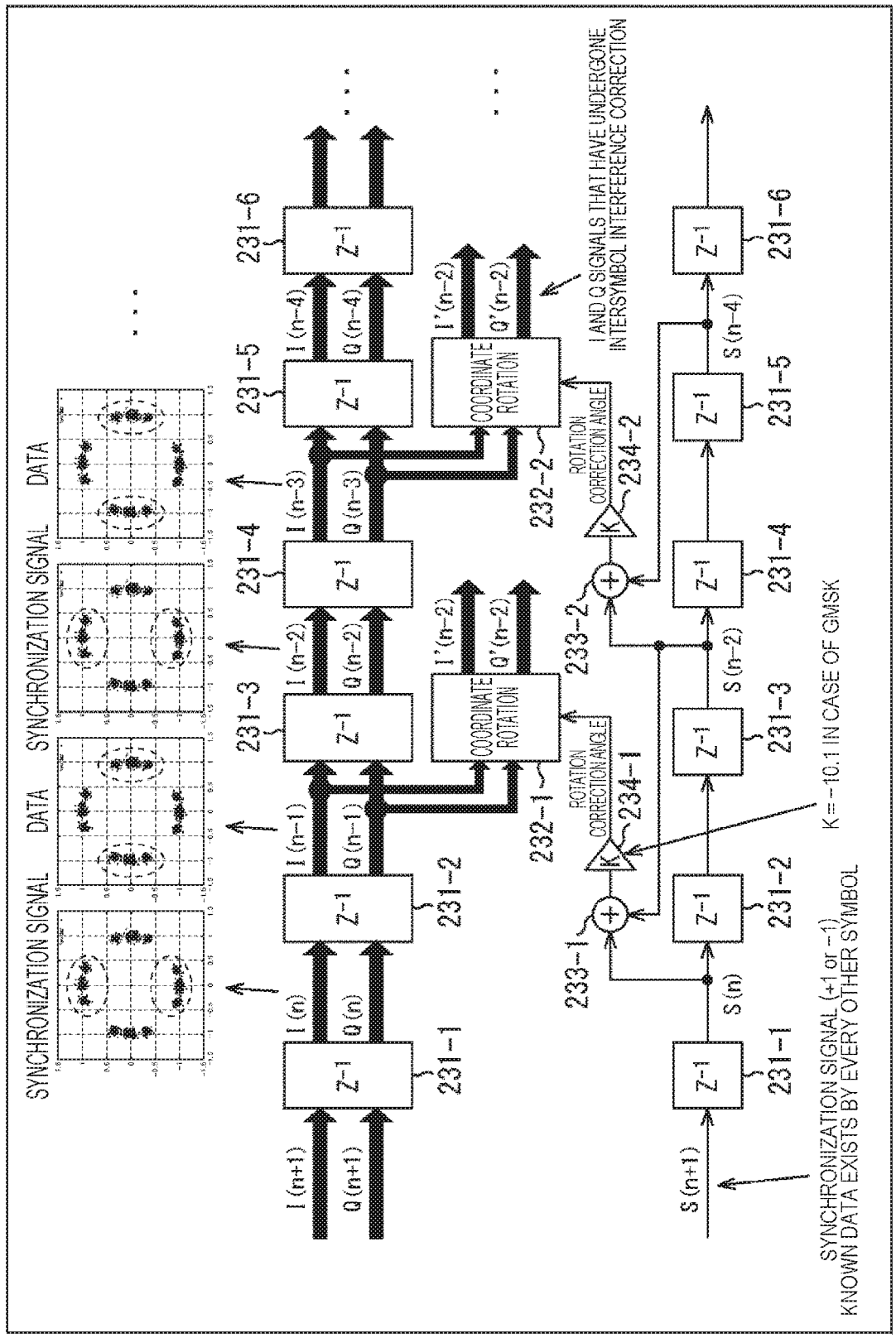
FIG. 13 is a diagram illustrating an exemplary state of correction.

Next, correction of intersymbol interference performed in step S226 in FIG. 12 will be described FIG. 13 illustrates an example indicating how intersymbol interference occurs. For example, it is assumed that the high sensitivity reception apparatus 102 receives a transmission signal having a configuration as in the example of FIG. 6. In this case, inputting the received signals one symbol at a time into the delay unit 231-1 to delay unit 231-6 arranged in series causes the symbols of the synchronization signal and the symbols of the data to be input one by one alternately.

For example, when the symbol S(n) is defined as a symbol the synchronization signal (=Q (n)), the preceding symbol S(n−1) is a symbol (=I(n−1)) of the data, the immediately preceding symbol S(n−2) is a symbol (=Q(n−2)) of the synchronization signal, the preceding symbol S(n−3) is a symbol (=I(n−3)) of the data, and the preceding symbol S(n−4) is a symbol (=Q(n−4)) of the synchronization signal.

Since the symbol of the synchronization signal is known, the intersymbol interference correction unit 226 corrects the symbol of the data as a correction target using the symbols of the synchronization signal immediately before and immediately after the symbol of the data as the correction target. That is, with operation of adding the values of the symbols of the preceding and succeeding synchronization signals and converting them into the rotation angle, it is possible to obtain the influence (rotation angle) due to intersymbol interference. With operation of rotating the symbol of data by the same angle in the opposite direction, it is possible to perform correction to suppress the influence by intersymbol interference.

For example, in correcting the symbol S(n−1) (=I (n−1)) of data in FIG. 13, an adder 233-1 is used to add the symbol S(n) (=Q(n)) of the synchronization signal with the symbol S(n−2) (=Q(n−2)) of the synchronization signal and then an amplifier 234-1 is used to multiply a result of addition by K times (for example, K=−10.0) to obtain correction amount (rotation correction angle), and then a coordinate rotation unit 232-1 is used to rotate the symbol S(n−1) (=I(n−1)) of data by the obtained rotation correction angle (in this, the direction of rotation is opposite to the direction of rotation due to intersymbol interference since K is negative).

The same applies to the case of correcting a symbol S(n−3) (=I(n−3)) of data. That is, operation needed is to use the adder 233-1 to add the symbol S(n−2) (=Q(n−2)) of the synchronization signal and the symbol S(n−4) (=Q(n−4)) of the synchronization signal, use the amplifier 234-2 to multiply the result of addition by K times (for example, K=−10.0) to obtain a correction amount (rotation correction angle), and use the coordinate rotation unit 232-2 to rotate the symbol S(n−3) (=I(n−3)) of data by the rotation correction angle.

Figure 14:
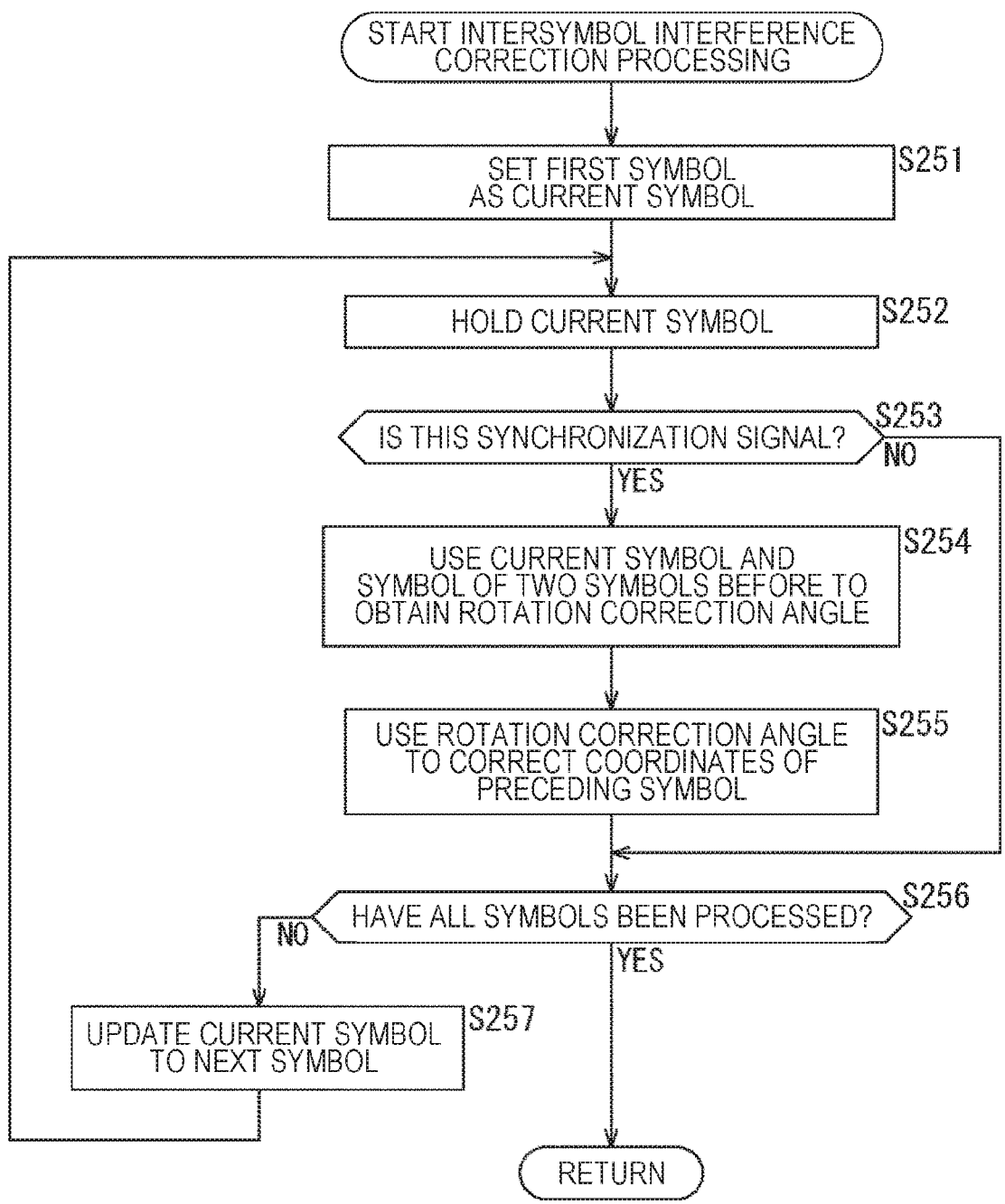
FIG. 14 is a flowchart illustrating an exemplary flow of intersymbol interference correction processing.

The intersymbol interference correction unit 226 performs correction such as described above for each of symbols of data. An example of a flow of such intersymbol interference correction processing (that is, the intersymbol interference correction processing executed in step S226 of FIG. 12) will be described with reference to the flowchart of FIG. 14.

When the intersymbol interference correction processing is started, the intersymbol interference correction unit 226 sets the first symbol as a current symbol in step S251.

In step S252, the intersymbol interference correction unit 226 holds the current symbol. In step S253, the intersymbol interference correction unit 226 determines whether or not the current symbol is a symbol of a synchronization signal. In a case where it is determined that the current symbol is a symbol of the synchronization signal, the processing proceeds to step S254.

In step S254, the intersymbol interference correction unit 226 uses the current symbol and the symbol two symbols before (that is, the symbol immediately before the synchronization signal) to obtain a rotation correction angle of the immediately preceding symbol (that is, symbol of data). In step S255, the intersymbol interference correction unit 226 rotates (that is, corrects) the coordinates of the immediately preceding symbol (that is, symbol of data) by the rotation correction angle obtained in step S254.

For example, as illustrated in the constellation of FIG. 4, in a case where the symbol of data is rotated by e from the I axis by intersymbol interference, θ can be obtained from the preceding and succeeding symbols of the synchronization signal, and thus, by correcting the symbol of data by −θ, it is possible to return the symbol of data to the I axis. That is, this correction can be used to suppress the influence due to intersymbol interference.

With completion of the processing of step S255, the processing proceeds to step S256. Moreover, in a case where it is determined in step S253 that the current symbol is a symbol of data, the processing in step S254 and step S255 is skipped, and the processing proceeds to step S256.

In step S256, the intersymbol interference correction unit 226 determines whether or not all the symbols have been processed. In a case where it is determined that there is a non-processed symbol, the processing moves on to step S257.

In step S257, the intersymbol interference correction unit 226 updates the current symbol to the next symbol. With completion of the processing of step S257, the processing returns to step S252, and the processing of step S252 and subsequent steps is repeated. That is, the intersymbol interference correction unit 226 executes the processing of steps S252 to S257 for each of symbols. Then, in a case where it is determined in step S256 that all the symbols have been processed, the intersymbol interference correction processing is finished and the processing returns to FIG. 12.

With this correction executed in this manner, it is possible to suppress the influence of intersymbol interference and to properly demodulate the received signal. That is, the high sensitivity reception apparatus 102 can transmit information with higher accuracy.

2. Second Embodiment

Application Example: Symbol Arrangement

While the above description is an example in which the selection unit 166 of the transmission apparatus 101 alternately selects the synchronization signal and data for each of symbols to generate a transmission signal, the selection unit 166 only has to select the synchronization signal one or both of the timings of immediately before and immediately after selection of the symbol of data. That is, the selection unit 166 only has to select the symbol of the synchronization signal at least any one of immediately before and after selecting the symbol of data.

In general, each of symbols in a frame is transmitted sequentially (continuously in the time direction), so that in the transmission signal, a certain symbol of data should have another adjacent symbol each present in two directions, that is, a front direction and a rear direction. In addition, intersymbol interference occurs between those adjacent symbols. That is, a certain symbol of data is influenced by the preceding symbol or the succeeding symbol. As described above, with the adjacent symbol that is known (that is, when adjacent symbol is the symbol of the synchronization signal), it is possible to suppress the influence from the symbol.

That is, with the setting in which at least one of the two symbols adjacent to a certain symbol of data in the transmission signal is the symbol of the synchronization signal, it is possible to suppress the influence of at least that symbol on the reception side, enabling the transmission apparatus 101 to transmit information with higher accuracy. Of course, in a case where both two symbols adjacent to the symbol of data are known in the transmission signal, it is possible to further suppress the influence of the intersymbol interference on the reception side. That is, the transmission apparatus 101 can transmit information more accurately.

In other words, in a case where the symbol of the synchronization signal is arranged at least immediately before or after the symbol of data in the radio signal received by the high sensitivity reception apparatus 102, the high sensitivity reception apparatus 102 can at least correct the symbol of data on the basis of the symbol of the synchronization signal and can suppress the influence of the intersymbol interference with at least symbols of the synchronization signal. That is, the high sensitivity reception apparatus 102 can realize more accurate information transmission. Of course, in a case where both two symbols adjacent to the symbol of data are known (synchronous signals) in the transmission signal, the high sensitivity reception apparatus 102 can correct the symbol of data on the basis of the symbols of the both of the synchronization signals, making it possible to suppress influence of intersymbol interference from the two directions. That is, the high sensitivity reception apparatus 102 can realize further accurate information transmission.

Figure 15:
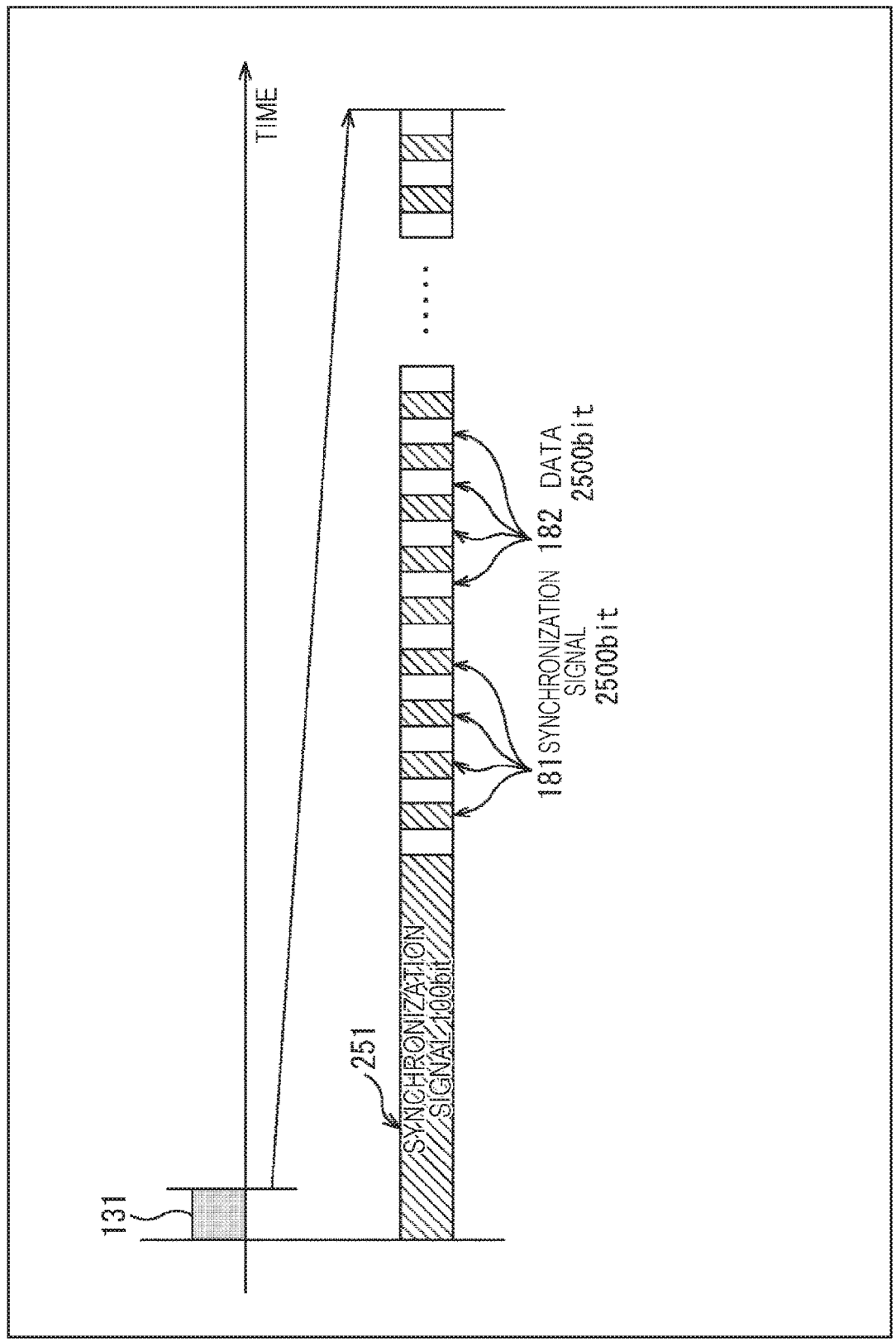
FIG. 15 is a diagram illustrating a main configuration example of transmission data.

Furthermore, such an arrangement may be adopted for all symbols of data, or may be adopted for some of the symbols alone. That is, for example, it is allowable in the transmission apparatus 101 that the selection unit 166 selects the symbols of the synchronization signal at one or both of timings of immediately before and immediately after a symbol, for all symbols of data. Note that the number of the symbols of the synchronization signal and the number of the symbols of data may be or need not be equal to each other. For example, as illustrated in FIG. 15, in a part of the single frame transmission signal 131, a plurality of symbols of the synchronization signal may be arranged to be continuous as the synchronization signal 251. That is, the selection unit 166 may select a plurality of symbols of a part of the synchronization signal consecutively.

Figure 16:
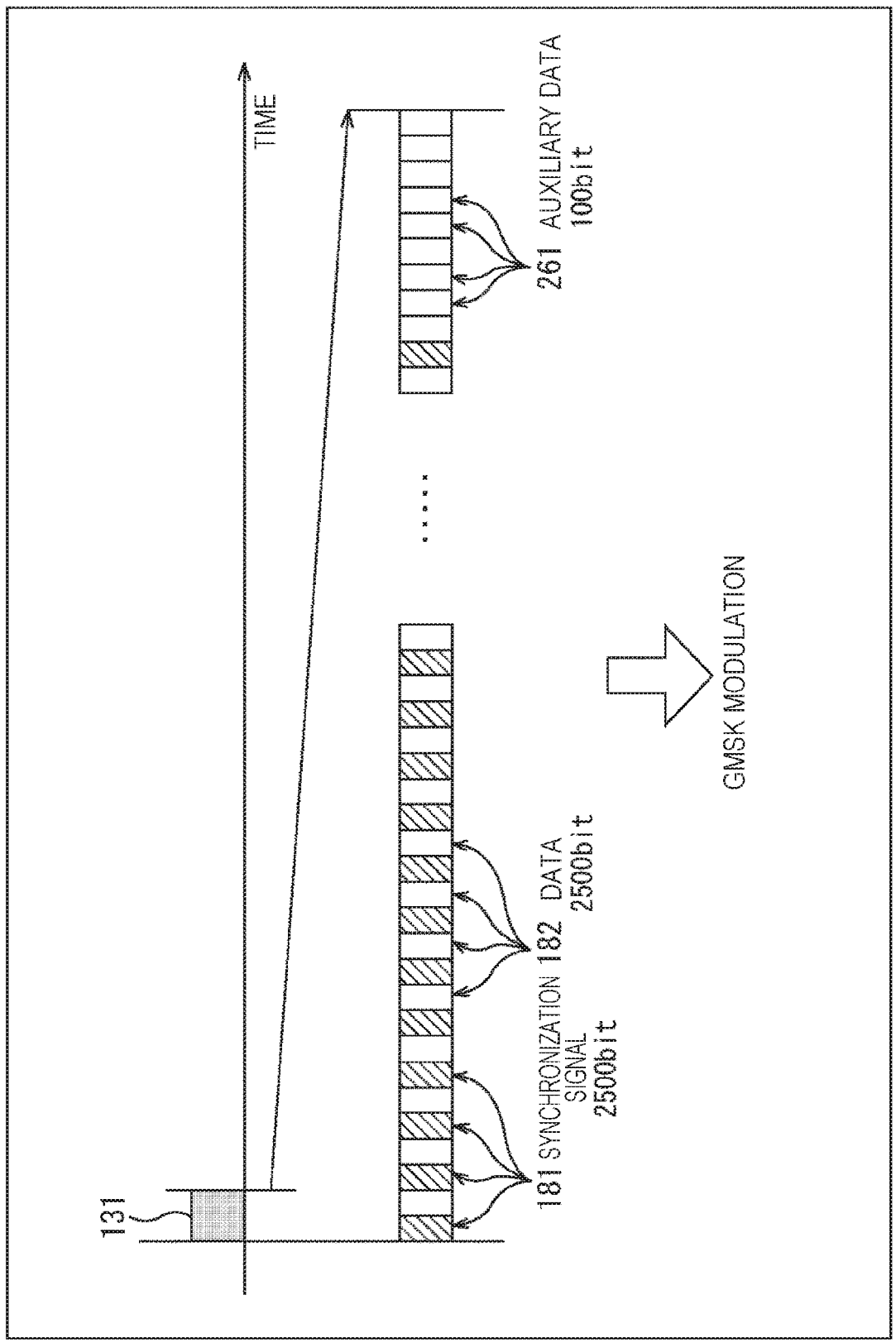
FIG. 16 is a diagram illustrating a main configuration example of transmission data.

In addition, the selection unit 166 may be configured to select the symbols of the synchronization signal at one or both of timings of immediately before and immediately after a symbol, for a part of the symbols of data. In other words, the selection unit 166 may be configured to select a plurality of symbols of a part of the data consecutively. For example, as illustrated in FIG. 16, in a part of the single frame transmission signal 131, a plurality of symbols of the data may be arranged to be continuous as auxiliary data 261. Note that arrangement in which a plurality of symbols is continuous as described above would make it difficult to perform the correction for suppressing intersymbol interference as described above, and thus, the auxiliary data 261 is preferably information of low importance that would bring little influence even if demodulation fails.

Application Example: Modulation Scheme

Note that while the above description is an example in which the transmission signal undergoes GMSK modulation, it is allowable to use any modulation scheme. For example, modulation schemes other than GMSK modulation may be applied. Furthermore, the transmission signal may be modulated by a plurality of modulation schemes. For example, the transmission signal that has undergone GMSK modulation may be modulated by still another modulation scheme. For example, it is allowable to apply chirp modulation on the transmission signal that has undergone GMSK modulation. Chirp modulation is a modulation scheme that increases or decreases signal frequency in a time domain in a predetermined range. Chirp modulation enables multiplexing of transmission signals.

Application Example: Correction Scheme

In addition, methods of correcting symbols for suppressing intersymbol interference depends on modulation schemes or the like, and may be a method other than the rotation correction described above. For example, the amplitude of the signal may be corrected.

Application Example: Intersymbol Interference Correction In Symbol of Synchronization Signal Note that when the CPU 210 performs signal processing on the received signal in the high sensitivity reception apparatus 102, it is also allowable to correct a symbol of the synchronization signal in addition to performing correction of data on the basis of the synchronization signal as described above. An example of a flow of signal processing in that case will be described with reference to the flowcharts of FIGS. 17 and 18. This signal processing corresponds to the signal processing described with reference to the flowchart of FIG. 12, and is the processing executed in step S209 of FIG. 11.

Figure 17:
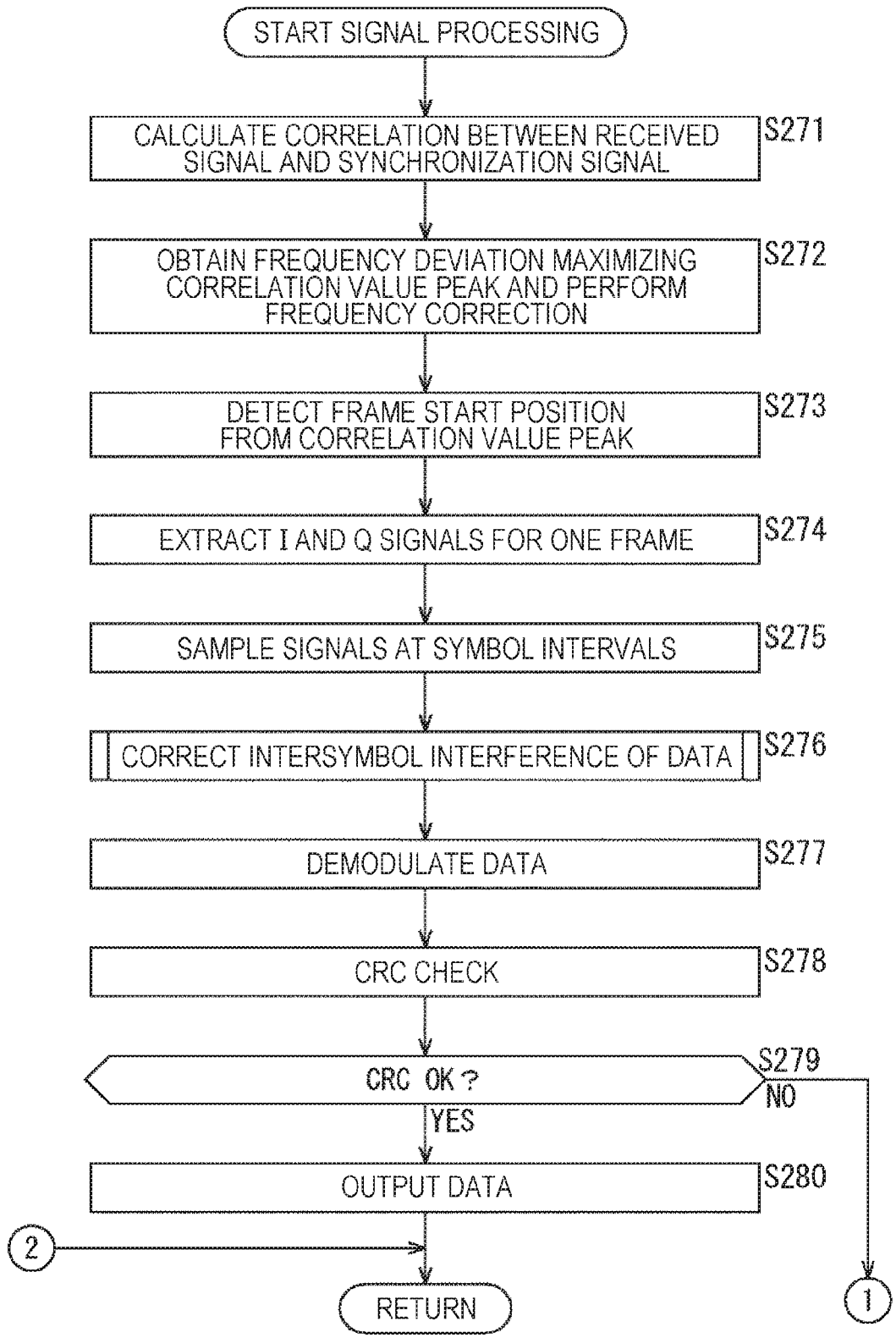
FIG. 17 is a flowchart illustrating an exemplary flow of signal processing.

When the signal processing is started, processing of step S271 to step S280 in FIG. 17 is executed in substantially similar manner as the processing of step S221 to step S230 in FIG. 12.

Figure 18:
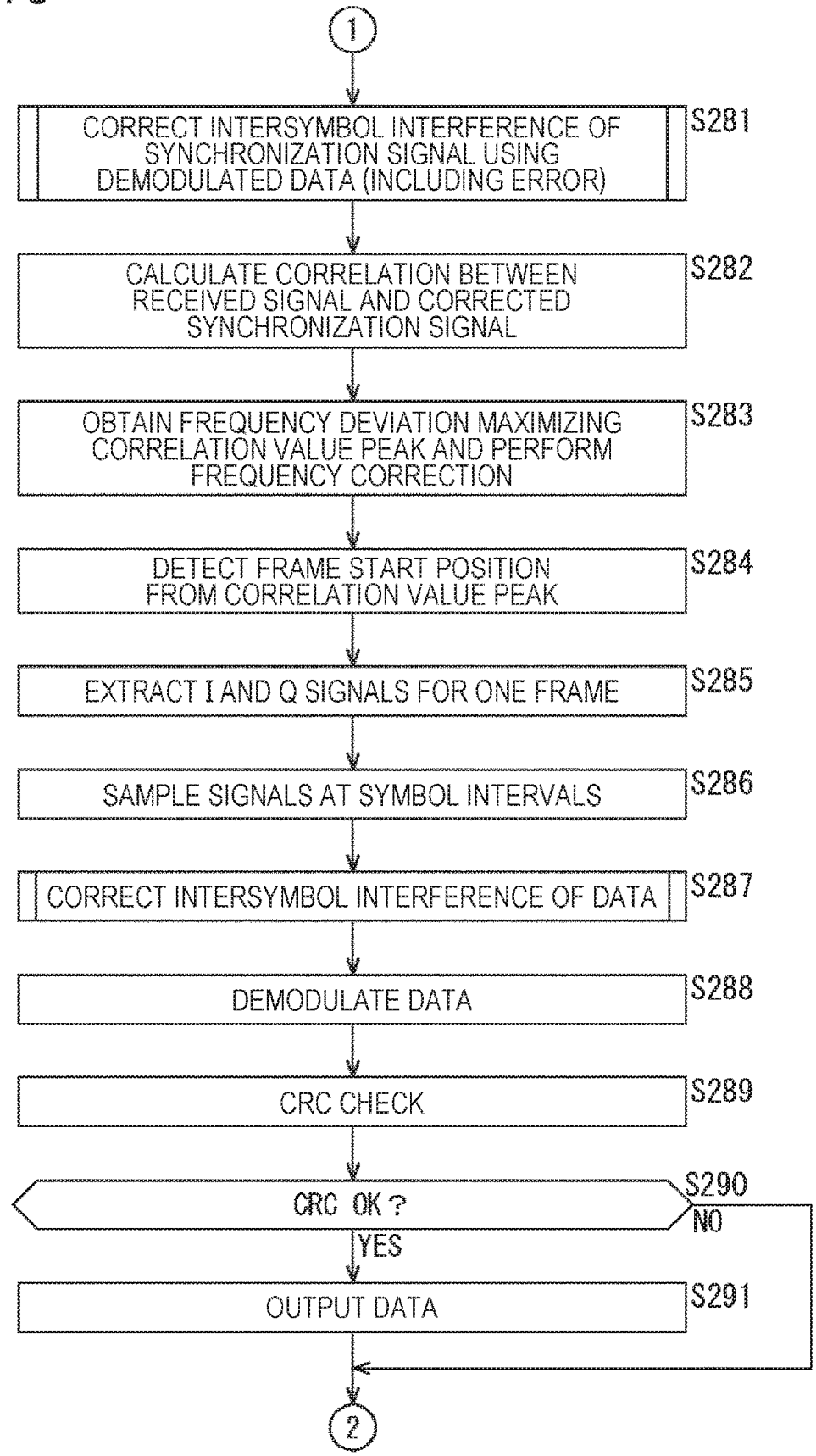
FIG. 18 is a flowchart illustrating an exemplary flow of signal processing, following FIG. 17.

Note that in a case where it is determined in step S279 of FIG. 17 that the demodulated data has not passed the inspection, the processing proceeds to FIG. 18.

In step S281 of FIG. 18, the intersymbol interference correction unit 226 corrects intersymbol interference of the synchronization signal using data including an error. This correction is substantially similar to the case of the intersymbol interference correction processing on the symbol of data described with reference to the flowchart of FIG. 14. That is, the synchronization signal and the data are only required to be exchanged in this intersymbol interference correction processing.

After correction of the synchronization signal, the processing of steps S282 to S291 is executed similarly to the processing of steps S221 to S230 of FIG. 12, using the corrected synchronization signal. That is, the intersymbol interference correction similar to that in the first embodiment is performed again.

Since the influence of intersymbol interference appears not only in symbols of data but also in symbols of synchronization signals, it might be difficult, in the case of the method described in the first embodiment, to properly correct the symbol of data due to the influence of intersymbol interference on the synchronization signal. Improper correction would generate an error causing failure of the symbol of the corresponding data in the CRC, check. In the case of the method described in the first embodiment, such symbols have been discarded.

In the present embodiment, as described above, the correction of the symbol of data is performed again after correction of the symbols of the synchronization signal, making it possible to reduce the errors of the data due to the influence of the intersymbol interference on the synchronization signal. That is, the high sensitivity reception apparatus 102 can more properly demodulate the received signal and realize more accurate transmission of information.

In addition, with execution of the processing as illustrated in the flowcharts of FIGS. 17 and 18, processing such as correction of the symbol of the synchronization signal and second correction of data would be omitted in a case where no error occurs in the data in the first correction, making it possible to suppress an increase in the load.

Application Example: Plurality of Times of Transmission of Frame

Figure 19:
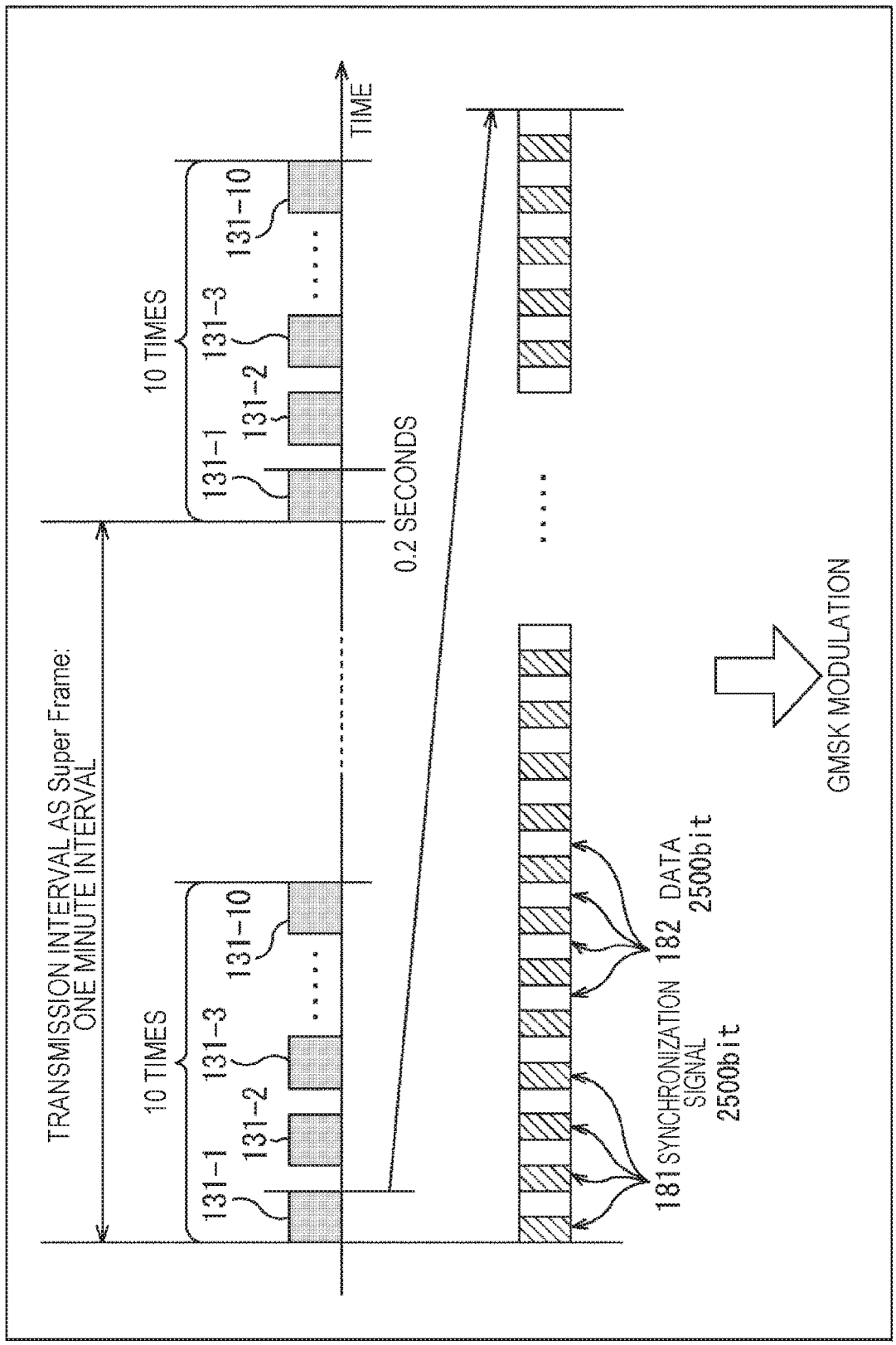
FIG. 19 is a diagram illustrating a main configuration example of transmission data.

In addition, a same frame may be transmitted and received a plurality of times. For example, the transmission apparatus 101 may transmit a transmission signal as a super frame (Super Frame) at one minute intervals as illustrated in FIG. 19, and may transmit the frame 131 ten times within one super frame (that is, transmit same frames 131-1 to 131-10). Configurations of each of the frames 131 are similar to the case described with reference to FIG. 6, and the synchronization signal 181 and the data 182 are alternately arranged for each of symbols.

The number of times of transmission of the frame 131 per super frame can be determined to any number, and may be nine or less, or may be 11 or more. Moreover, the transmission interval (gap length) of each of the frames 131 can be determined to any interval, and may be, for example, 2 ms or more. Moreover, the transmission time of each of the frames 131 can be determined to be any length, and may be, for example, 0.2 seconds or less. Moreover, the time per super frame can also be determined to be any length and may be shorter or longer than one minute.

Figure 20:
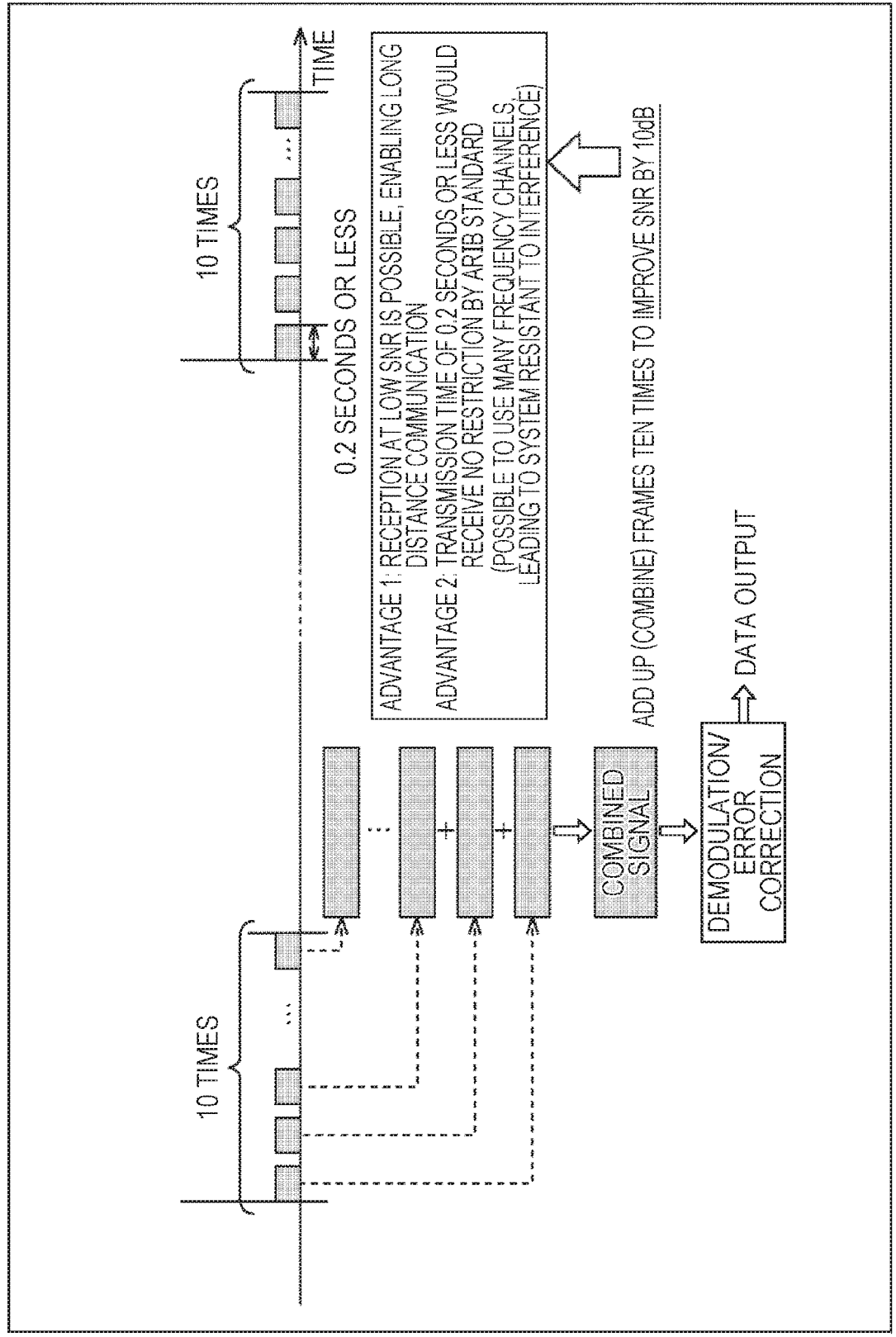
FIG. 20 is a diagram illustrating an exemplary state of reception.

In addition, the high sensitivity reception apparatus 102 may receive such a transmission signal. That is, as in the example illustrated in FIG. 20, the high sensitivity reception apparatus 102 may receive the same frame a plurality of times, combine (add) the received plurality of frames to generate a combined signal, and demodulate the combined signal.

With such processing, it is possible to improve the S/N ratio of the received signal. That is, reception with low SNR is implementable, enabling communication at a longer distance. In addition, as described above, the transmission time setting of one frame to 0.2 seconds or less would receive no restriction by the provision of Association of Radio Industries and Businesses (ARIB), in the case of Japan. Therefore, it is possible to assign many transmission channels to this transmission, enabling transmitting with selected relatively uncrowded channels, achieving construction of a more robust system, that is, an interference resistant system.

3. Third Embodiment

<Anti-Theft System>

In the above, the position notification system 100 has been described as an example. The present technology can be further applied to any communication system. For example, the transmission apparatus 101 may also be installed on a moving body or the like, in addition to a human.

Figure 21:
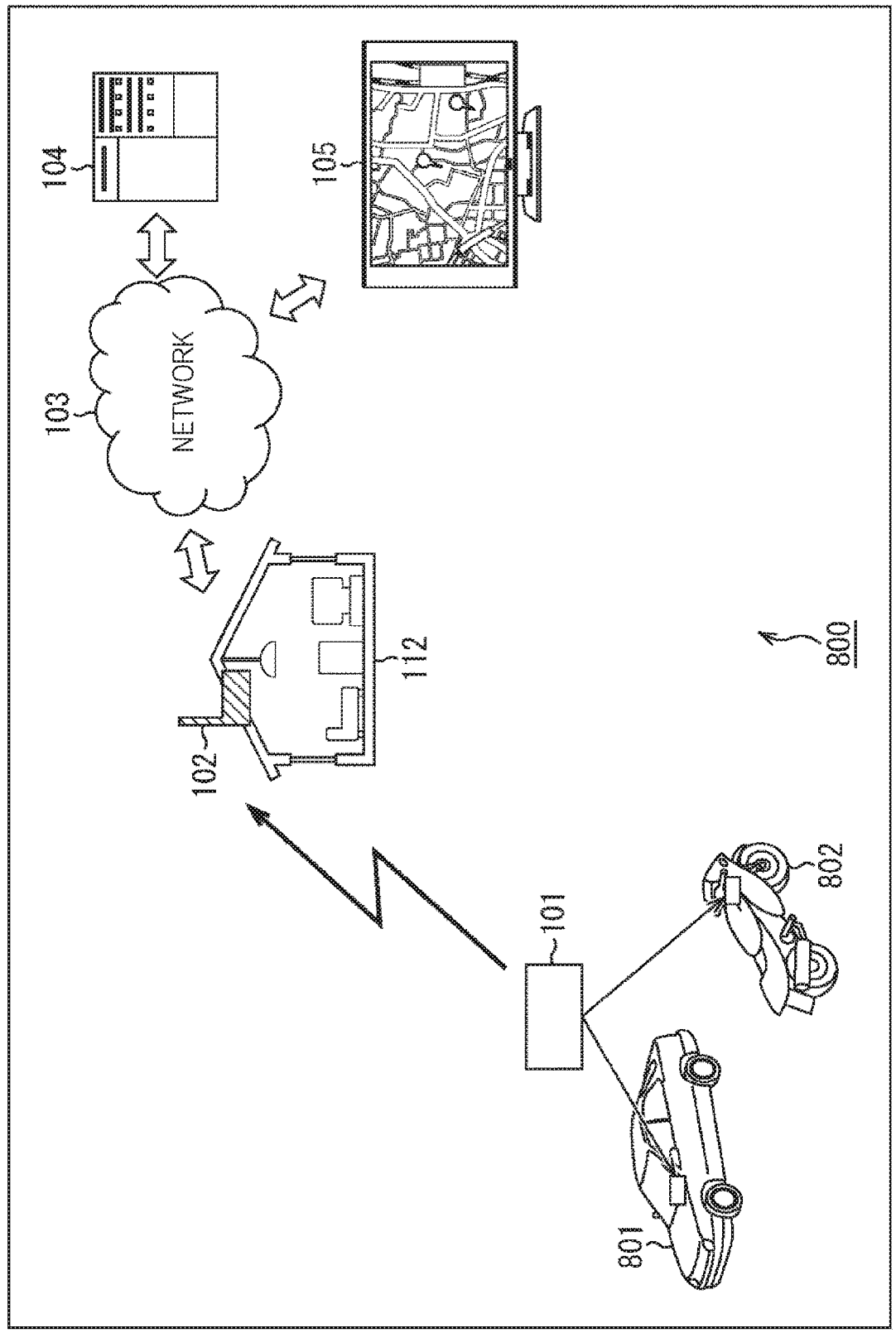
FIG. 21 is a diagram illustrating a main configuration example of an anti-theft system.

For example, the present technology can be applied to an anti-theft system 800 for preventing theft of an automobile, a motorbike, or the like, as illustrated in FIG. 21. In this anti-theft system 800, the transmission apparatus 101 is installed on an object as a position monitoring object by a user, including an automobile 801 or a motorbike 802 owned by the user, for example. Similarly to the position notification system 100, the transmission apparatus 101 provides notification of its own position information (that is, the position information of the automobile 801 and the motorbike 802) to the high sensitivity reception apparatus 102 as appropriate. That is, the user can access the server 104 from the terminal apparatus 105 to grasp the position of the automobile 801 and the motorbike 802 similarly to the case of the position notification system 100. Therefore, the user can grasp the position of the automobile 801 or the motorbike 802 even in a case where they are stolen, enabling the user to easily take back the stolen automobile 801 and the motorbike 802.

In the case of such the anti-theft system 800 as well, the present technology can be applied to the transmission apparatus 101 and the high sensitivity reception apparatus 102 similarly to the case of the position notification system 100. In addition, application of the present technology makes it possible to improve the reception ratio.

<Other Communication Systems>

Note that information to be transmitted and received may include any information. For example, the transmission data generation unit 161 of the transmission apparatus 101 may generate transmission information including images, sounds, measurement data, identification information of devices, etc., parameter setting information, control information such as instructions, and the like. Furthermore, the transmission information may include a plurality of types of information such as a combination of image and voice, a combination of identification information, setting information, and control information, for example.

Furthermore, the transmission data generation unit 161 may be configured to generate transmission information including information supplied from another apparatus, for example. For example, the transmission data generation unit 161 may generate transmission information including information (sensor output) output from various sensors that perform detection, measurement, or the like, about arbitrary variables or their change amount of: images, light, brightness, saturation, electricity, sound, vibration, acceleration, velocity, angular velocity, force, temperature (rather than temperature distribution), humidity, distance, area, volume, shape, flow rate, time point, time period, magnetism, chemical substance, odor, or the like.

In other words, the present technology can be applied to any application systems such as solid shape measurement, space measurement, object observation, movement deformation observation, biometric observation, authentication processing, monitoring, autofocus, imaging control, lighting control, tracking processing, input/output control, electronic device control, actuator control, and the like.

Furthermore, the present technology can be applied to a system used in any fields such as transportation, medical care, crime prevention, agriculture, livestock industry, mining, beauty, factory, household appliance, weather, monitoring of the nature, and the like. For example, the present technology can also be applied to a system for capturing an image for entertainment, such as a digital camera and a mobile device with a camera function. Furthermore, the present technology can also be applied to systems to be used in transportation, such as an on-vehicle system that photographs a front, rear, surroundings, interior, or the like, of an automobile in order to ensure safe driving such as automatic stop, and to recognize driver's conditions or the like, for example, a monitoring camera system to monitor driving vehicles and roads, and a range-finding system to perform measurement of a distance between vehicles or the like. Furthermore, for example, the present technology can also be applied to a system used for security, using a surveillance camera for crime prevention applications, a camera for person authentication, or the like. Furthermore, for example, the present technology can also be applied to a system used for sports or the like, using various sensors or the like that can be used for sports applications, such as wearable cameras. Furthermore, for example, the present technology can be applied to a system used for agriculture, using various sensors such as cameras for monitoring conditions of fields and crops. Furthermore, for example, the present technology can be applied to a system used for livestock industry using various sensors for monitoring the condition of domestic animals such as pigs and cattle. Furthermore, the present technology can be applied to a system for monitoring natural conditions such as volcanoes, forests, oceans, and the like, a meteorological observation system for observing weather, temperature, humidity, wind speed, sunshine time, or the like, for example, and systems for observing wildlife such as birds, fish, reptiles, amphibians, mammals, insects, plants, and the like, for example.

<Communication Apparatus>

Furthermore, specifications of radio signals and information to be transmitted and received can be determined arbitrarily. Moreover, while the above description is an example in which the present technology is applied to the transmission apparatus 101 and the high sensitivity reception apparatus 102, the present technology can also be applied to any transmission apparatus, any reception apparatus, and any transmission/reception apparatus. That is, the present technology can be applied to any types of communication apparatuses and communication systems.

<Computer>

A series of processing described above can be executed either in hardware or with software. In execution of the series of processing with software, it is only required to have a configuration as a computer that can execute the software. Herein, the computer includes a computer incorporated in a dedicated hardware, a general-purpose personal computer on which various programs are installed to enable execution of various types of functions, and the like, for example.

Figure 22:
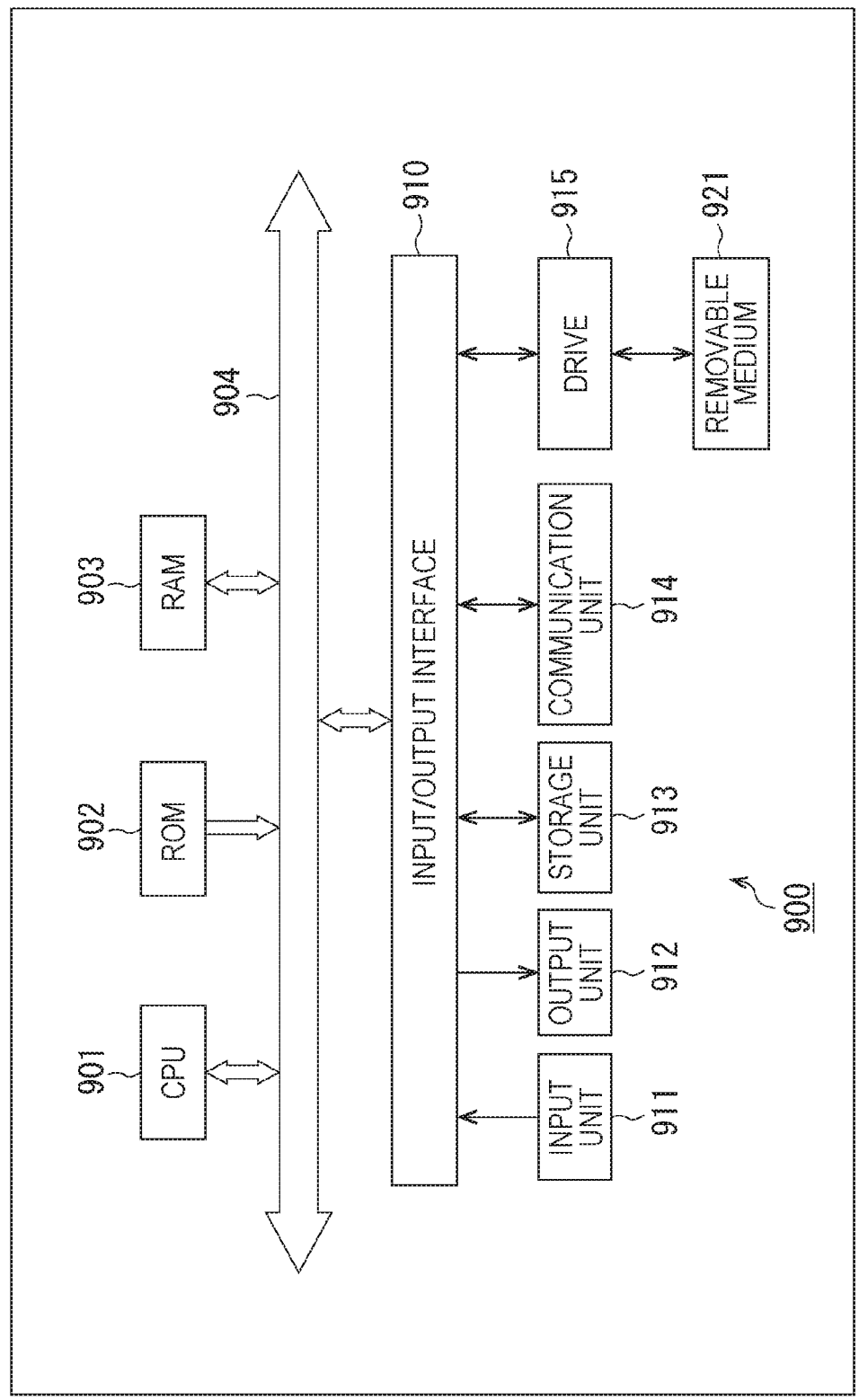
FIG. 22 is a block diagram illustrating a main configuration example of a control unit.

FIG. 22 is a block diagram illustrating an exemplary configuration of a computer. As illustrated in FIG. 22, a computer 900 includes a central processing unit (CPU) 901, a read only memory (ROM) 902, a random access memory (RAM) 903 interconnected with each other via a bus 904.

The bus 904 is also connected with an input/output interface 910. The input/output interface 910 is connected with an input unit 911, an output unit 912, a storage unit 913, a communication unit 914, and a drove 915.

The input unit 911 includes optional input devices such as a keyboard, a mouse, a touch screen, an image sensor, a microphone, a switch, an input terminal, and the like. The output unit 912 includes optional output devices such as a display, a speaker, an output terminal, and the like. The storage unit 913 includes an optional storage medium such as a hard disk, a RAM disk, a solid state drive (SSD), a non-volatile memory such as a universal serial bus (USB) memory, and the like. The communication unit 914 includes a communication interface of a certain communication standard of one or both of wired or wireless communication, such as Ethernet (registered trademark), Bluetooth (registered trademark), USB, High-Definition Multimedia Interface (HDMI) (registered trademark), IrDA, and the like. The drive 915 drives a removable medium 921 having an optional storage medium such as a magnetic disk, an optical disk, a magneto-optical disk, or a semiconductor memory.

In the computer 900 configured as described above, the CPU 901 loads a program stored in the storage unit 913 into the RAM 903 via the input/output interface 910 and the bus 904 and executes the loaded program, so as to implement functions equivalent to part or whole of the hardware configuration as illustrated in FIGS. 5 and 9, for example. That is, at least a part of the series of processing described above is executed. The RAM 903 also appropriately stores data, or the like, that are needed when the CPU 901 executes various types of processing.

The program executed by the CPU 901 can be stored, for example, in the removable medium 921 as a package medium or the like for application. In this case, the program can be installed in the storage unit 913 via the input/output interface 910, with the removable medium 921 attached to the drive 915. Alternatively, the program can be provided via a wired or wireless transmission medium including a local area network, an Internet, and digital satellite broadcasting.

In that case, the program can be received at the communication unit 914 and installed in the storage unit 913. Alternatively, the program can be installed in the ROM 902 or the storage unit 913 beforehand.

In addition, the series of processing described above can be executed either in hardware, with software, or partially in hardware and partially with software.

<Others>

Embodiments of the present technology are not limited to the above-described embodiments but can be modified in a variety of manners within a scope of the present technology.

Moreover, the present technology can also be implemented as any configuration constituting an apparatus or a system, for example, processors in the form of system large scale integration (LSI) or the like, modules that use a plurality of processors and the like, units that use a plurality of modules and the like, sets obtained by further adding other functions to the units (namely, a partial configuration of the apparatus), or the like, for example.

In addition, in the present description, the system represents a set of a plurality of constituents (devices, modules (parts), or the like). In other words, all the constituents may be in a same housing but they do not have to be in the same housing. Accordingly, a plurality of apparatuses, housed in separate housings, connected via a network can be a system. An apparatus in which a plurality of modules is housed in one housing can also be a system.

In addition, a configuration described above as a single apparatus (or processing unit) may be divided and configured as a plurality of apparatuses (or processing units), for example. Conversely, a configuration described above as a plurality of devices (or processing units) may be collected and configured as a single device (or processing unit). In addition, configurations other than the above-described configurations may, of course, be added to the configurations of the apparatuses (or the processing units). Furthermore, as long as configurations or operation are substantially the same in the entire system, the configurations of certain apparatuses (or processing units) may be partially included in the configurations of the other apparatuses (or other processing units)

Moreover, the present technology can be configured as a form of cloud computing in which one function is shared in cooperation for processing among a plurality of devices via a network, for example.

Furthermore, the above-described program can be executed by an arbitrary apparatus, for example. In that case, it is only required that the apparatus has necessary functions (functional blocks, etc.) and necessary information can be obtained.

Moreover, each of steps described in the above flowcharts can be executed on one apparatus or shared by a plurality of apparatuses for processing, for example. Furthermore, in a case where one step includes a plurality of stages of processing, the plurality of stages of processing included in the one step can be executed on one apparatus or can be shared by a plurality of apparatuses.

Note that the program executed by the computer may have processing of steps by which the program is described processed in a time series in an order described in the present description, or may be executed in parallel or individually executed at a required timing such as being called. That is, as long as there is no inconsistency, it is allowable to execute the processing of each of steps in an order different from the order described above. Furthermore, the processing of the step of describing this program may be executed in parallel with the processing of another program, or may be executed in combination with the processing of another program.

Note that the present technology described as a plurality of embodiments in this description can be independently and separately implemented as long as there is no inconsistency. Of course, it is also possible to implement any combination of the plurality of embodiments of the present technology. For example, the present technology described in any of the embodiments can be implemented in combination with the present technology described in other embodiments. Moreover, any embodiment of the present technology described above can be implemented in combination with other technology.

Note that the present technology may also be configured as follows.

(1) A transmission apparatus including:

a selection unit that selects one of known data and unknown data for each of symbols, as transmission data, while selecting a symbol of the known data for a reception side at one or both of timings of immediately before and immediately after selection of a symbol of the unknown data for the reception side;

a modulation unit that modulates each of the symbols of the transmission data, selected by the selection unit; and a transmission unit that transmits a transmission signal obtained by modulation of each of the symbols of the transmission data performed by the modulation unit.

(2) The transmission apparatus according to (1), in which the known data is a synchronization pattern for synchronization.

(3) The transmission apparatus according to (1) or (2), in which the modulation unit applies Gaussian filtered minimum shift keying (GMSK) modulation to each of symbols of the transmission data.

(4) The transmission apparatus according to any of (1) to (3), in which the modulation unit further applies chirp modulation on the transmission data.

(5) The transmission apparatus according to any of (1) to (4), in which the transmission unit transmits the transmission signal a plurality of times.

(6) The transmission apparatus according to any of (1) to (5), in which the selection unit selects the symbol of the known data located at one or both of immediately before and immediately after each of all the symbols of the unknown data.

(7) The transmission apparatus according to any of (1) to (6), in which the selection unit alternately selects the symbol of the known data and the symbol of the unknown data.

(8) The transmission apparatus according to any of (1) to (7), in which the selection unit consecutively selects a plurality of symbols being part of the unknown data.

(9) The transmission apparatus according to any of (1) to (8), in which the selection unit consecutively selects a plurality of symbols being par of the known data.

(10) A transmission method including:

selecting one of known data and unknown data for each of symbols, as transmission data, while selecting a symbol of the known data for a reception side at one or both of timings of immediately before and immediately after selection of a symbol of the unknown data for the reception side;

modulating each of the symbols of the selected transmission data; and transmitting a transmission signal obtained by modulation of each of the symbols of the transmission data.

(11) A reception apparatus including:

a reception unit that receives a transmission signal transmitted from a transmission side; and a correction unit that corrects a symbol of unknown data included in the transmission signal on the basis of a symbol or known data included in the transmission signal received by the reception unit.

(12) The reception apparatus according to (11), in which the correction unit corrects the symbol of the unknown data on the basis of the symbol of the known data located at one or both of immediately before and immediately after the symbol of the unknown data.

(13) The reception apparatus according to (11) or (12), in which the known data is arranged on a Q axis and the unknown data is arranged on an I axis.

(14) The reception apparatus according to any of (11) to (13), in which the correction unit applies rotation correction on the unknown data.

(15) The reception apparatus according to any of (11) to (14), in which the transmission signal is a signal that has undergone Gaussian filtered minimum shift keying (GMSK) modulation.

(16) The reception apparatus according to any of (11) to (15), in which the correction unit applies amplitude correction on the unknown data.

(17) The reception apparatus according to any of (11) to (16), in which the known data and the unknown data are alternately arranged for each of symbols, in the transmission signal.

(18) The reception apparatus according to any of (11) to (17), in which the correction unit corrects the symbol of the known data and then corrects the symbol of the unknown data on the basis of the corrected symbol of the known data.

(19) The reception apparatus according to any of (11) to (18), in which the reception unit receives the transmission signal including an identical symbol a plurality of times and combines waveforms of the transmission signals, and the correction unit corrects the symbol of the unknown data included in a combined signal on the basis of the symbol of the known data included in the combined signal obtained by the reception unit.

(20) A reception method including:

receiving a transmission signal transmitted from a transmission side; and correcting a symbol of unknown data included in the received transmission signal on the basis of a symbol of known data included in the received transmission signal.

REFERENCE SIGNS LIST

100 Position notification system
101 Transmission apparatus
102 High sensitivity reception apparatus
103 Network
104 Server
111 Elderly person
161 Transmission data generation unit
162 Cyclic redundancy check (CRC) addition unit
163 Gold code generation unit
164 Multiplication unit
165 Synchronization signal generation unit
166 Selection unit
167 Gaussian filtered minimum shift keying (GMSK) modulation unit
168 Amplifier
169 Antenna
171 Mapping unit
172 LPF(Low-Pass Filter)
173 PLL(Phase Locked Loop)
201 Antenna
202 Low noise amplifier
203 BPF(Band Pass Filter)
204 Carrier oscillation unit
205 Multiplication unit
206 90-degree shifter
207 Multiplication unit
208 Analog/digital (A/D) converter
209 Memory
210 CPU
221 Correlation calculation unit
222 Frequency correction unit
223 Start position detection unit
224 Frame extraction unit
225 Symbol sampling unit
226 intersymbol interference correction unit
227 Demodulation unit
228 Error determination unit
229 Output unit
800 Anti-theft system

The invention claimed is:

1. A transmission apparatus comprising:
selection circuitry that selects one of known data and unknown data for each of a plurality of symbols, as transmission data, while selecting at least one symbol from the plurality of symbols of the known data for a reception side at one or both of timings of immediately before and immediately after selection of a symbol from the plurality of symbols of the unknown data for the reception side;
modulation circuitry that modulates a phase of each of the symbols of the transmission data, selected by the selection circuitry; and
transmission circuitry that transmits a transmission signal obtained by modulation of the phase of each of the symbols of the transmission data performed by the modulation circuitry,
wherein the known data is arranged on a Q axis and the unknown data is arranged on an I axis.

2. The transmission apparatus according to claim 1, wherein the known data is a synchronization pattern for synchronization.

3. The transmission apparatus according to claim 1, wherein the modulation circuitry further applies chirp modulation on the transmission data.

4. The transmission apparatus according to claim 1, wherein the transmission circuitry transmits the transmission signal a plurality of times.

5. The transmission apparatus according to claim 1, wherein the selection circuitry selects the at least one symbol from the plurality of symbols of the known data located at both of immediately before and immediately after each of all the symbols of the unknown data.

6. The transmission apparatus according to claim 1, wherein the selection circuitry alternately selects the at least one symbol from the plurality of symbols of the known data and the symbol from the plurality of symbols of the unknown data.

7. The transmission apparatus according to claim 1, wherein the selection circuitry consecutively selects a first series of symbols from the plurality of symbols being part of the unknown data.

8. The transmission apparatus according to claim 1, wherein the selection circuitry consecutively selects a second series of symbols from the plurality of symbols being part of the known data.

9. A transmission method comprising:
selecting one of known data and unknown data for each of a plurality of symbols, as transmission data, while selecting at least one symbol from the plurality of symbols of the known data for a reception side at one or both of timings of immediately before and immediately after selection of a symbol from the plurality of symbols of the unknown data for the reception side;
modulating a phase of each of the symbols of the selected transmission data; and
transmitting a transmission signal obtained by modulation of the phase of each of the symbols of the transmission data,
wherein the known data is arranged on a Q axis and the unknown data is arranged on an I axis.

10. A reception apparatus comprising:
reception circuitry that receives a transmission signal transmitted from a transmission side; and
correction circuitry that corrects a phase of a symbol of unknown data included in the transmission signal on a basis of a symbol of known data included in the transmission signal received by the reception circuitry,
wherein the known data is arranged on a Q axis and the unknown data is arranged on an I axis.

11. The reception apparatus according to claim 10,
wherein the correction circuitry corrects the symbol of the unknown data on the basis of the symbol of the known data located at one or both of immediately before and immediately after the symbol of the unknown data.

12. The reception apparatus according to claim 10,
wherein the correction circuitry applies rotation correction on the unknown data.

13. The reception apparatus according to claim 10,
wherein the transmission signal is a signal that has undergone Gaussian filtered minimum shift keying (GMSK) modulation.

14. The reception apparatus according to claim 10,
wherein the correction circuitry applies amplitude correction on the unknown data.

15. The reception apparatus according to claim 10,
wherein the known data and the unknown data are alternately arranged for each of a plurality of symbols, in the transmission signal.

16. The reception apparatus according to claim 10,
wherein the correction circuitry corrects the symbol of the known data and then corrects the symbol of the unknown data on the basis of the corrected symbol of the known data.

17. A reception apparatus comprising,
reception circuitry that receives a transmission signal transmitted from a transmission side; and
correction circuitry that corrects a symbol of unknown data included in the transmission signal on a basis of a symbol of known data included in the transmission signal received by the reception circuitry,
wherein the reception circuitry receives the transmission signal including an identical symbol from the plurality of symbols a plurality of times and combines waveforms of the transmission signals, and
the correction circuitry corrects the symbol of the unknown data included in a combined signal on the basis of the symbol of the known data included in the combined signal obtained by the reception circuitry.

18. A reception method comprising:
receiving a transmission signal transmitted from a transmission side; and
correcting a phase of a symbol of unknown data included in the received transmission signal on the basis of a symbol of known data included in the received transmission signal,
wherein the known data is arranged on a Q axis and the unknown data is arranged on an I axis.

* * * * *